US012661802B2

(12) United States Patent
Okita et al.

(10) Patent No.: US 12,661,802 B2
(45) Date of Patent: Jun. 23, 2026

(54) SUBSTRATE PROCESSING DEVICE AND SUBSTRATE PROCESSING METHOD

(71) Applicant: SCREEN Holdings Co., Ltd., Kyoto (JP)

(72) Inventors: Nobuaki Okita, Kyoto (JP); Kazuki Nakamura, Kyoto (JP); Yoshifumi Okada, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 298 days.

(21) Appl. No.: 18/467,715

(22) Filed: Sep. 14, 2023

(65) Prior Publication Data

US 2024/0100712 A1     Mar. 28, 2024

(30) Foreign Application Priority Data

Sep. 26, 2022     (JP) ................................. 2022-152228

(51) Int. Cl.
| | |
|---|---|
| *B25J 11/00* | (2006.01) |
| *B08B 1/20* | (2024.01) |
| *B25J 13/08* | (2006.01) |

(52) U.S. Cl.
CPC ............. *B25J 11/0085* (2013.01); *B08B 1/20* (2024.01); *B25J 13/088* (2013.01)

(58) Field of Classification Search
CPC ....... B25J 11/0085; B25J 13/088; B08B 1/20; H01L 21/67051; H01L 21/02057; H01L 21/0209; H01L 21/02096; H01L 21/67259; H01L 21/67742; H01L 21/67745; H01L 21/67748; H01L 21/67751; H01L 21/681; H01L 21/6838; H01L 21/68707; H01L 21/68728
See application file for complete search history.

(56) References Cited

U.S. PATENT DOCUMENTS

| | | | | |
|---|---|---|---|---|
| 2014/0023776 A1* | 1/2014 | Kuwahara | ......... | H01L 21/67259 |
| | | | | 118/697 |
| 2018/0211859 A1* | 7/2018 | Kuwahara | ......... | H01L 21/67742 |
| 2020/0294833 A1 | 9/2020 | Takano | | |

(Continued)

FOREIGN PATENT DOCUMENTS

| | | |
|---|---|---|
| JP | H11330037 | 11/1999 |
| JP | 2003007662 | 1/2003 |

(Continued)

*Primary Examiner* — Christopher W Carter
(74) *Attorney, Agent, or Firm* — JCIPRNET

(57) ABSTRACT

A substrate cleaning device includes a chamber, a first processing part and a second processing part. The chamber forms a processing space including a first processing position and a second processing position. The first processing part performs a first process on a substrate disposed at the first processing position in the chamber. The second processing part performs a second process on the substrate disposed at the second processing position in the chamber. A main robot loads and unloads the substrate with respect to the substrate cleaning device by moving a hand holding the substrate. In addition, the main robot receives the substrate disposed at the first processing position by causing the hand to enter the processing space, transporting the substrate to the second processing position, and positioning the substrate.

10 Claims, 24 Drawing Sheets

(56) References Cited

U.S. PATENT DOCUMENTS

| | | | |
|---|---|---|---|
| 2021/0050241 A1 | 2/2021 | Kodama | |
| 2022/0088793 A1 | 3/2022 | Shinohara et al. | |
| 2022/0093420 A1 | 3/2022 | Shinohara et al. | |
| 2022/0216073 A1 * | 7/2022 | Mori | ................. H01L 21/67259 |

FOREIGN PATENT DOCUMENTS

| | | |
|---|---|---|
| JP | 2014022589 | 2/2014 |
| JP | 2021048270 | 3/2021 |
| JP | 2022051026 | 3/2022 |
| JP | 2022051029 | 3/2022 |
| KR | 20220037977 | 3/2022 |
| KR | 20220037989 | 3/2022 |
| KR | 20220038001 | 3/2022 |

* cited by examiner

SUBSTRATE PROCESSING DEVICE AND SUBSTRATE PROCESSING METHOD

CROSS-REFERENCE TO RELATED APPLICATION

This application claims the priority benefits of Japanese application no. 2022-152228, filed on Sep. 26, 2022. The entirety of the above-mentioned patent application is hereby incorporated by reference herein and made a part of this specification.

BACKGROUND

Technical Field

The disclosure relates to a substrate processing device and a substrate processing method for performing a predetermined process on a substrate.

Description of Related Art

A substrate processing apparatus has been used to perform various types of processing on various substrates such as a FPD (Flat Panel Display) substrate used in a liquid crystal display device or an organic EL (Electro Luminescence) display device, a semiconductor substrate, an optical disk substrate, a magnetic disk substrate, a magneto-optical disk substrate, a photomask substrate, a ceramic substrate, and a solar cell substrate. A substrate cleaning apparatus is used to clean the substrate.

The substrate cleaning apparatus described in Japanese Patent Application Laid-Open No. 2022-51029 includes an upper holding device, a lower holding device, and a lower surface cleaning device. The upper holding device includes a pair of lower chucks and a pair of upper chucks. A substrate arranged between the pair of lower chucks and between the pair of upper chucks is sandwiched between the pair of lower chucks and the pair of upper chucks. Thus, the substrate to be cleaned is held with the pair of lower chucks and the pair of upper chucks in contact with an outer peripheral end of the substrate. The lower surface cleaning device cleans a lower surface central region of the substrate that is held by the upper holding device.

The lower holding device is a so-called spin chuck, and rotates the substrate in a horizontal posture while sucking and holding the lower surface central region of the substrate. The lower surface cleaning device also cleans a region (hereinafter referred to as a lower surface outer region) surrounding the lower surface central region on the lower surface of the substrate that is held by the lower holding device.

The upper holding device and the lower holding device are arranged in the up-down direction with a space therebetween. Therefore, the substrate cleaning device further includes a transfer device that transfers the substrate between the upper holding device and the lower holding device. The transfer device includes multiple support pins and a pin linking member that links the pins. The support pins are installed to the pin linking member to extend upward. The pin linking member moves in the up-down direction in a state in which the substrate is supported by the upper ends of the support pins. Accordingly, the substrate is transported between the upper holding device and the lower holding device. According to the above, the transfer device moves the substrate in the up-down direction in a state in which the substrate is supported on the support pins. Each of the support pins has a rigidity lower than a substrate support part (hand) of a transportation robot transporting the substrate. Therefore, each of the support pins is susceptible to vibrate due to the influence of the vibration that occurs at a driving part that vertically moves the pin linking member or the vibration that occurs near the transfer device. In such case, at the time when the substrate is transported between the upper holding device and the lower holding device, the substrate may possibly be displaced from the position where the substrate is supposed to be. In addition, the transfer device moves the substrate through the movement of the support pins in the up-down direction. However, the transfer device is not provided with a configuration for moving the support pins in the horizontal direction. Therefore, when a positional displacement in the horizontal direction occurs in the substrate when the substrate is received by the transfer device, for example, the position displacement cannot be resolved in the transfer device.

When the substrate held by the upper holding device is displaced, it is possible that the region that is supposed to be cleaned (the lower surface central region) is not cleaned correctly. In addition, when the substrate held by the lower holding device is displaced, it is possible that the region that is supposed to be cleaned (the lower surface outer region) is not cleaned correctly.

The disclosure provides a substrate processing device and a substrate processing method able to suppress a processing defect of the substrate from occurring due to a positional displacement.

SUMMARY

A substrate processing device according to an aspect includes: a processing unit; and a transportation device, having a holding part holding a substrate and configured to be able to load and unload the substrate with respect to the processing unit by moving the holding part. The processing unit includes: a chamber, having an opening part and forming a processing space comprising a first processing position and a second processing position; a first processing part, performing a first process on a substrate not yet processed that is accommodated in the chamber and disposed at the first processing position; and a second processing part, performing a second process on the substrate after the first process that is accommodated in the chamber and disposed at the second processing position. The transportation device receives the substrate disposed at the first processing position by causing the holding part to enter the processing space through the opening part, and transports the received substrate in the processing space to position the received substrate at the second processing position.

A substrate processing method according to another aspect includes: a step of processing a substrate by using a processing unit; and a step of transporting the substrate by using a transportation device. The processing unit includes: a chamber, having an opening part and forming a processing space comprising a first processing position and a second processing position; a first processing part, performing a first process on a substrate not yet processed that is accommodated in the chamber and disposed at the first processing position; and a second processing part, performing a second process on the substrate after the first process that is accommodated in the chamber and disposed at the second processing position. The transportation device has a holding part holding the substrate and configured to be able to load and unload the substrate with respect to the processing unit by moving the holding part. The step of processing the substrate includes: performing the first process on the substrate not yet processed by using the first processing part; and performing the second process on the substrate after the first process by using the second processing part, and the step of transporting the substrate includes: receiving the substrate disposed at the first processing position by causing the holding part to enter the processing space through the opening part, and transporting the received substrate in the processing space to position the received substrate at the second processing position.

Other features, elements, characteristics, and advantages of the present disclosure will become more apparent from the following description of preferred embodiments of the present disclosure with reference to the attached drawings.

BRIEF DESCRIPTION OF THE DRAWINGS

FIGS. 15A to 16C are schematic views illustrating an example of the operation of the substrate cleaning device of FIG. 5 and the main robot of FIG. 1.

FIGS. 16A to 16C are schematic views illustrating an example of the operation of the substrate cleaning device of FIG. 5 and the main robot of FIG. 1.

DESCRIPTION OF THE EMBODIMENTS

A substrate processing apparatus and a substrate processing method according to an embodiment of the disclosure will be described below with reference to the drawings. In the following, a substrate refers to a semiconductor substrate (wafer), a substrate for a flat panel display (FPD) used in a liquid crystal display device or an organic electro luminescence (EL) display device, an optical disk substrate, a magnetic disk substrate, a magneto-optical disk substrate, a photomask substrate, a ceramic substrate, or a solar cell substrate. In addition, in the embodiment, the upper surface of the substrate is a circuit forming surface (front surface), and the lower surface of the substrate is a surface (back surface) opposite to the circuit forming surface. In addition, in the embodiment, the substrate exhibits a circular shape with no notch.

1. First Embodiment

<1> Configuration of the Substrate Processing Device

Figure 1:
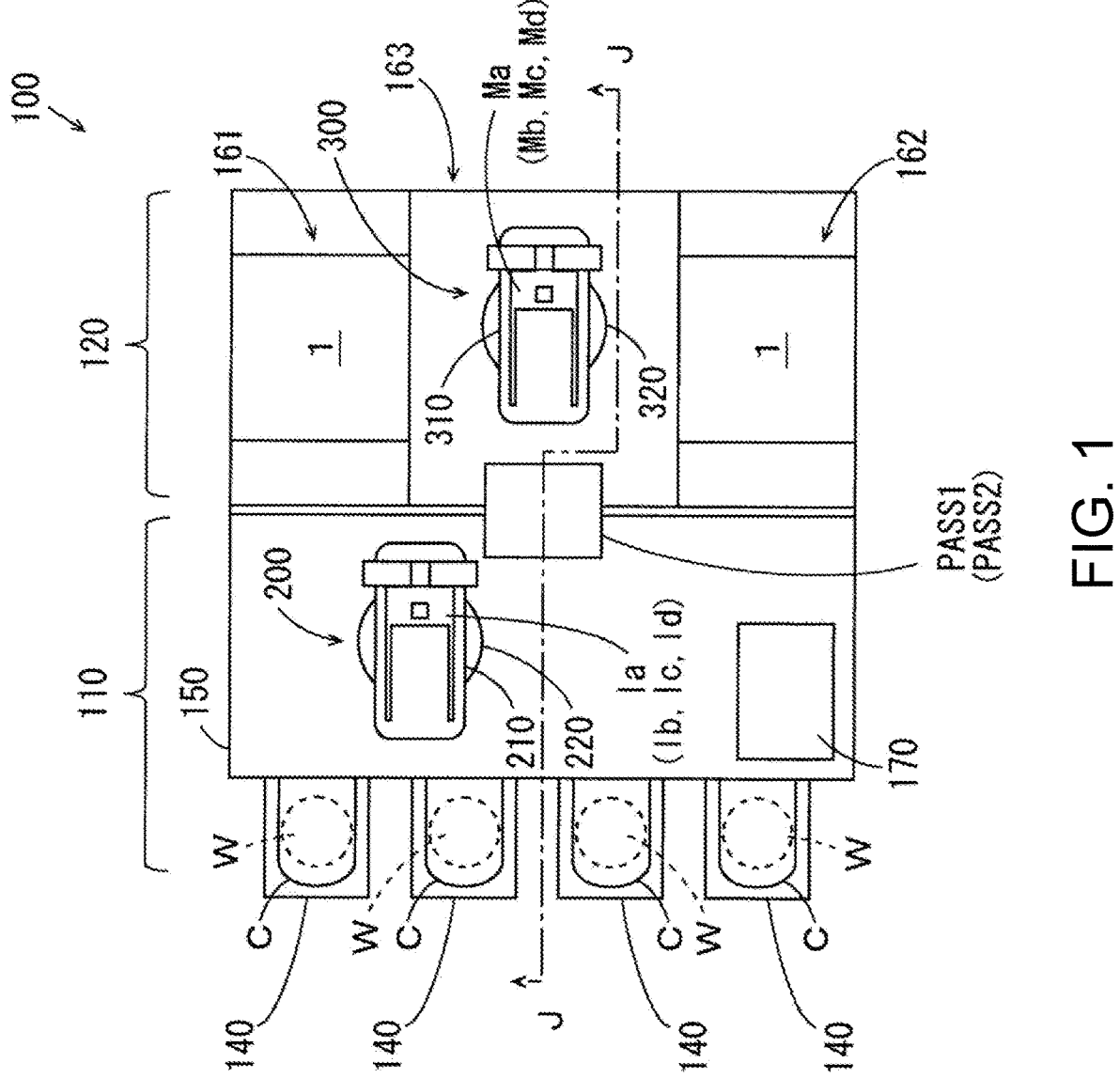
FIG. 1 is a schematic plan view illustrating a substrate processing device according to a first embodiment.
Figure 2:
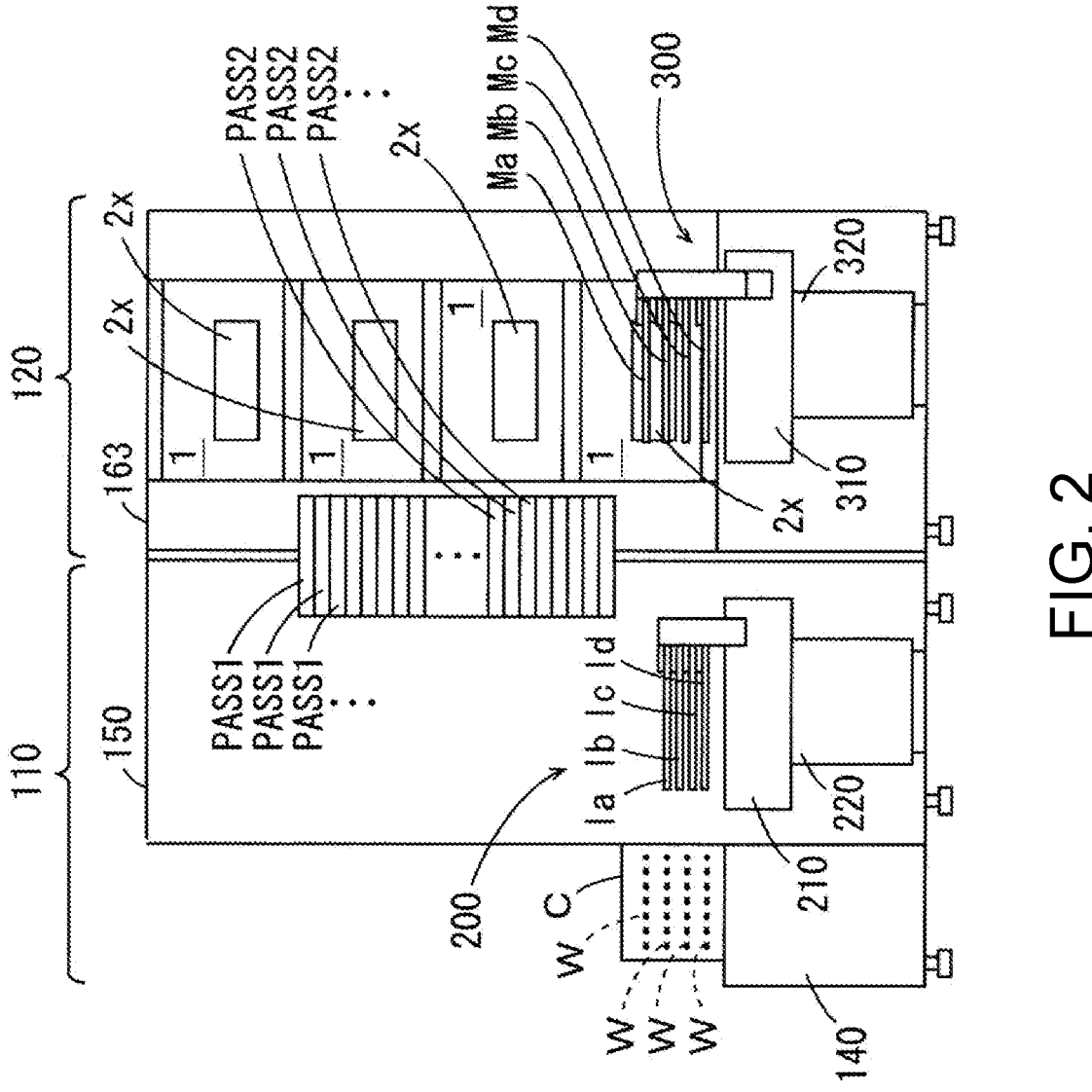
FIG. 2 is a schematic cross-sectional view of the substrate processing device taken along a J-J line of FIG. 1.

FIG. 1 is a schematic plan view illustrating a substrate processing device according to a first embodiment. FIG. 2 is a schematic cross-sectional view of the substrate processing device 100 taken along a J-J line of FIG. 1. As shown in FIG. 1, the substrate processing device 100 according to the embodiment is provided with an indexer block 110 and a processing block 120. The indexer block 110 and the processing block 120 are provided to be adjacent to each other.

The indexer block 110 includes multiple (four in the embodiment) carrier placement stages 140 and a transportation part 150. The carrier placement stages 140 are connected with the transportation part 150, and are disposed side-by-side in a row with a space therebetween. A carrier C accommodating multiple substrates W is placed on each carrier placement stage 140.

In the transportation part 150, an indexer robot 200 and a control device 170 are provided. The indexer robot 200 includes multiple (four in the embodiment) hands Ia, Ib, Ic, Id, a hand support member 210, and a transportation driving part 220.

The hands Ia to Id are configured to be able to respectively hold multiple substrates W, and, as shown in FIG. 2, are provided on the hand support member 210 in a state of being arranged side-by-side with a predetermined space therebetween in the up-down direction. The hand support member 210 is formed to extend in a direction, and supports the hands Ia to Id to be able to advance or retract in such direction. The transportation driving part 220 is configured to be movable in the horizontal direction (the direction in which the multiple carrier placement stages 140 are arranged), and supports the hand support member 210 so that the hand support member 210 rotates about a vertical axis and is able to move up and down. In addition, the transportation driving part 220 includes multiple motors and air cylinders, etc., and, in order to transport the substrates W by using the hands Ia to Id, moves the hand support part 210 in the horizontal direction, and rotates the hand support member 210 about a vertical axis to be moved up and down. In addition, the transportation driving part 220 causes the hands Ia to Id to advance or retract in the horizontal direction. The control device 170 is formed by a computer, etc., including a central processing unit (CPU), a random access memory (RAM), and a read-only memory (ROM), and controls the respective components in the substrate processing device 100.

As shown in FIG. 1, the processing block 120 includes cleaning parts 161, 162 and a transportation part 163. The cleaning part 161, the transportation part 163, and the cleaning part 162 are adjacent to the transportation part 150 and disposed to be arranged in such order. As shown in FIG. 2, in the cleaning parts 161, 162, multiple (four in the example) substrate cleaning devices 1 are disposed by being stacked in the up-down direction. Each of the substrate cleaning devices 1 has a loading/unloading port 2x (see FIG. 2) for loading the substrate W to the substrate cleaning device 1 and unloading the substrate W from the substrate cleaning device 1. The details of the configuration and the operation of the substrate cleaning device 1 will be described afterwards.

A main robot 300 is provided at the transportation part 163. The main robot 300 includes multiple (four in the embodiment) hands Ma, Mb, Mc, Md, and includes a hand support member 310 and a transportation driving mart 320. The hands Ma to Md have a common configuration, and are provided on the hand support member 310 in a state of being arranged in the up-down direction. Each of the hands Ma to Md is configured to be able to hold the substrate W in a horizontal posture. In addition, in each hands Ma to Md, a fixing device is provided. The fixing device serves to fix the substrate W at a predetermined position (referred to as a hand reference position in the following) in the hand.

Figure 3:
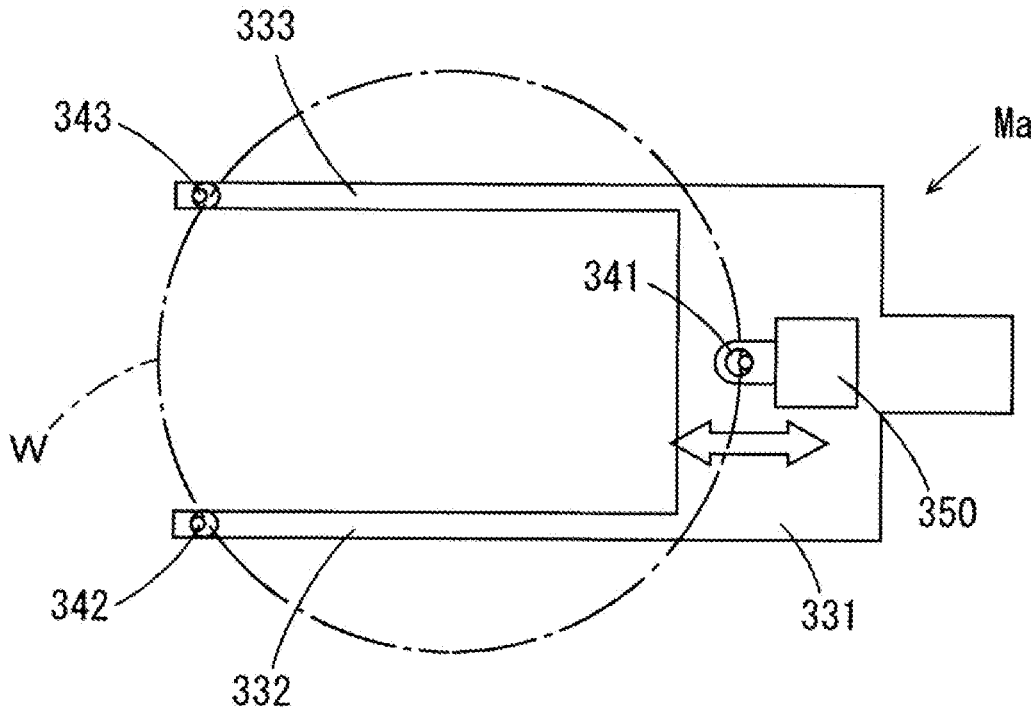
FIG. 3 is a plan view of a hand of FIG. 1.
Figure 4:
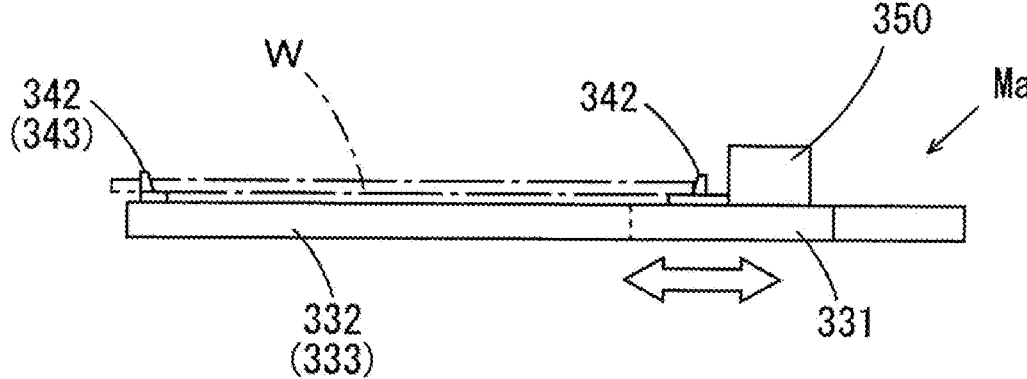
FIG. 4 is a side view of the hand of FIG. 1.

Here, the hand Ma and the fixing device in which the hand Ma is provided are described. FIG. 3 is a plan view of the hand Ma of FIG. 1. FIG. 4 is a side view of the hand Ma of FIG. 1. In FIGS. 3 and 4, the outer shape of the substrate W held by the hand Ma is indicated by using a dot chain line. As shown in FIG. 3, the hand M includes a band base part 331 and two hand arm parts 332, 333. The hand base part 331 has a plate shape in a substantially rectangular shape extending in a direction. The hand arm parts 332, 333 are formed to respectively extend linearly from the two ends of the hand base part 331 in a direction along a direction (referred to as a hand advancing/retracting direction in the following) orthogonal to the direction.

A support piece 341 for supporting the substrate W is provided to be movable in the hand advancing/retracting direction (see the white arrow signs in FIGS. 3 and 4) in the upper surface substantially central portion of the hand base part 331. The support piece 341 has a support surface able to support the lower surface of the substrate W and a contact surface able to contact the outer peripheral end of the substrate W. In the upper surface substantially central portion of the hand base part 331, a fixing device 350 moving the support piece 341 in the hand advancing/retracting direction is further provided.

A support piece 342 having the same configuration as the support piece 341 is fixed to the vicinity of the tip end of the hand arm part 332. A support piece 343 having the same configuration as the support piece 341 is also fixed to the vicinity of the tip end of the hand arm part 333.

In the case where the substrate W is not held by the hand Ma, the fixing device 350 adjusts the position of the support piece 341 in the hand advancing/retracting direction, so that a circle passing through the contact surfaces of the support pieces 341, 342, 343 in plan view becomes larger than the substrate W.

At the time of transferring the substrate W by using the hand Ma, the substrate W as the holding target is placed on the support surfaces of all of the support pieces 341, 342, 343. In such state, the fixing device 350 moves the support piece 341, so that the outer peripheral end of the substrate W contacts the contact surfaces of all of the support pieces 341, 342, 343. Specifically, the fixing device 350 moves the support piece 341 in the hand advancing/retracting direction so as to approach the support pieces 342, 343. Accordingly, in the state in which the substrate W is fixed to the hand reference position, the substrate W is held by the hand Ma.

Meanwhile, at the time of handing over the substrate by using the hand Ma, in the state in which the substrate W is fixed to the hand reference position, the fixing device 350 moves the support piece 341, so that the outer peripheral end of the substrate W is separated from the contact surfaces of at least some of the support pieces 341, 341, 343. Specifically, the fixing device 350 moves the support piece 341 in the hand advancing/retracting direction so as to move away from the support pieces 342, 343. Accordingly, the holding state of the substrate W in the hand Ma is removed.

As shown in FIG. 1, the hand support member 310 is formed to extend in a direction, and supports the hands Ma to Md to be able to respectively advance or retract independently in the direction. The transportation driving mart 320 supports the hand support member 310 rotatable around a vertical axis and able to be raised or lowered. In addition, the transportation driving part 320 includes multiple motors and air cylinders, etc., and rotates the hand support member 310 about the vertical axis and raises and lowers the hand support member 310, so as to transport the substrates W by using the hands Ma to Md. In addition, the transportation driving part 320 causes the hands Ma to Md to advance or retract in the horizontal direction.

Between the indexer block 110 and the processing block 120, multiple (four in the embodiment) substrate placement parts PASS1 and multiple substrate placement parts PASS2 are disposed to be stacked in the up-down direction to perform the transfer of the substrates W between the index robot 110 and the processing block 120 and between the indexer robot 200 and the main robot 300. The multiple substrate placement parts PASS1 are located higher than the multiple (four in the embodiment) substrate placement parts PASS2.

The multiple substrate placement parts PASS2 are used to hand over the substrates W from the indexer robot 200 to the main robot 300. The multiple substrate placement parts PASS1 are used to hand over the substrates W from the main robot 300 to the indexer robot 200.

The indexer robot 200 takes out the substrate W not yet processed from a carrier C of the carriers C placed on the carrier placement stages 140. In addition, the indexer robot 200 places the substrate W not yet processed that is taken out on one of the substrate placement parts PASS2. In addition, the indexer robot 200 accepts the processed substrate W placed in one of the substrate placement parts PASS1 and accommodates the processed substrate W in an empty carrier C.

The main robot 300 respectively takes multiple substrates W before processing placed in the multiple substrate placement parts PASS2 by using the hands Ma to Md. In addition, the main robot 3 respectively loads the substrates W before processing into the multiple substrate cleaning devices 1 of the cleaning part 161 or the cleaning part 162 by using the hands Ma to Md. In addition, the main robot 300 respectively unloads the substrates W after multiple processes in the substrate cleaning devices 1 by using the hands Ma to Md. Afterwards, the main robot 300 places the processed substrates W unloaded from the respective substrate cleaning devices 1 on one of the substrate placement parts PASS1.

In the substrate cleaning device 1 of the embodiment, a first processing position and a second processing position different from each other are set inside the substrate cleaning device 1. In addition, in the substrate cleaning device 1, a portion of the substrate W is cleaned in the state in which the substrate W is at the first processing position, and another portion of the substrate W is cleaned in the state in which the substrate W is at the second processing position. Therefore, in the substrate cleaning device 1, it is required to move the substrate W from the first processing position to the second processing direction.

Therefore, in the substrate processing device 100 according to the embodiment, in addition to the various transportation operations, the main robot 300 transports the substrate W between the first processing position and the second processing position in each substrate cleaning device 1. The details about the transportation of the substrate W between the first processing position and the second processing position by using the main robot 300 and the details of the operation of the substrate cleaning device 1 will be described in the following.

<2> Configuration of the Substrate Cleaning Device

Figure 5:
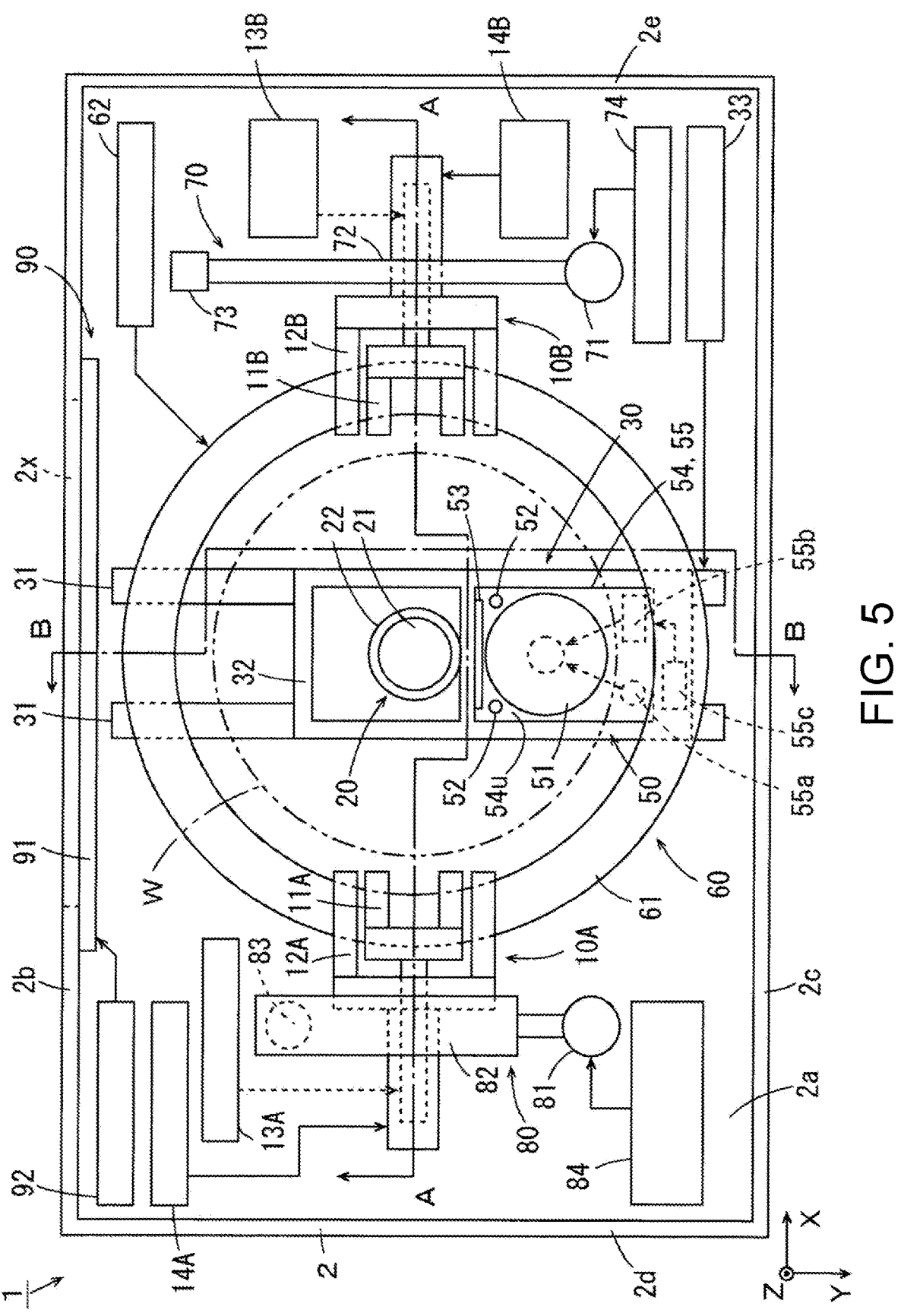
FIG. 5 is a schematic plan view of a substrate cleaning device of FIG. 1.
Figure 6:
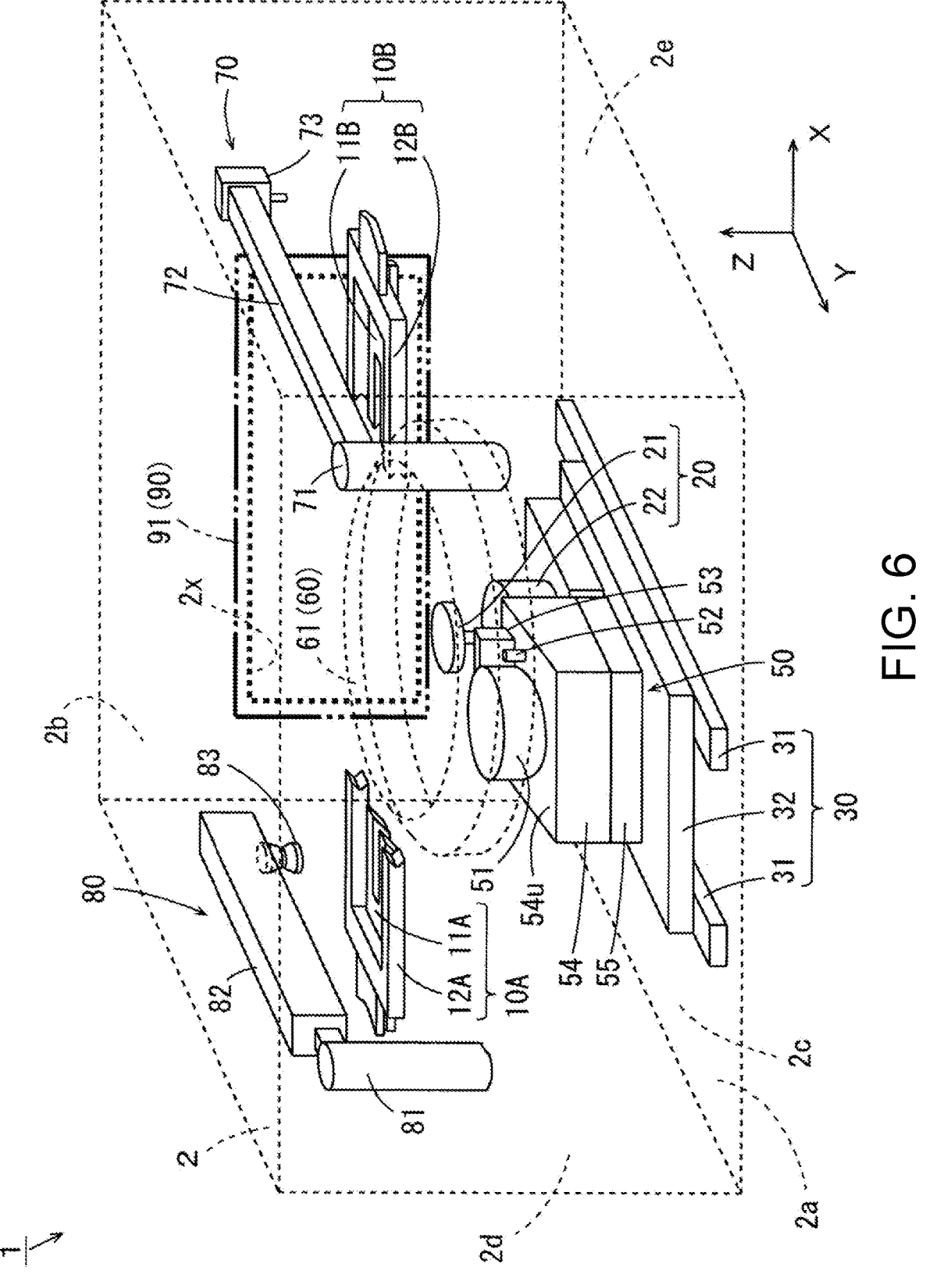
FIG. 6 is a perspective view illustrating the appearance of an internal configuration of the substrate cleaning device of FIG. 5.

FIG. 5 is a schematic plan view of the substrate cleaning device 1 of FIG. 1. FIG. 6 is a perspective view illustrating the appearance of an internal configuration of the substrate cleaning device 1 of FIG. 5. In the substrate cleaning device 1, X direction, Y direction, and Z direction orthogonal to each other are defined in order to clarify the position relationship. In FIGS. 5 and 6 and subsequent figures, X, Y and Z directions are indicated by arrow signs as appropriate. X direction and Y direction are orthogonal to each other in a horizontal plane, and Z direction is equivalent to the vertical direction.

As shown in FIG. 5, the substrate cleaning device 1 includes upper holding devices 10A, 10B, a lower holding device 20, a pedestal device 30, a lower surface cleaning device 50, a cup device, an upper surface cleaning device 70, an end cleaning device 80, and an opening/closing device 90. These components are provided in a unit housing 2. In FIG. 6, the unit housing 2 is indicated by a dot-chain line.

The unit housing 2 includes a rectangular bottom surface portion 2a, and four sidewall portions 2b, 2c, 2d, 2e extending outward from the four sides of the bottom surface portion 2a. The sidewall portions 2b, 2c face each other, and the sidewall portions 2d, 2e face each other. A rectangular opening is formed at the central portion of the sidewall portion 2b. The opening is the loading/unloading port 2x, and is used at the time of loading or unloading the substrate W with respect to the unit housing 2. In FIG. 6, the loading/unloading port 2x is indicated by a thick dot-chain line. In the following description, in Y direction, the direction from the interior of the unit housing 2 toward the exterior of the unit housing 2 via the loading/unloading port 2x (the direction from the sidewall portion 2c toward the sidewall portion 2b) is referred to as the front, and the direction opposite thereto (the direction from the sidewall portion 2b toward the sidewall portion 2c) is referred as the rear.

The opening/closing device 90 is provided in the portion where the loading/unloading port 2x is formed and a nearby region in the sidewall portion 2b. The opening/closing device 90 includes a shutter 91 configured to be able to open or close the loading/unloading port 2x and a shutter driving part 92 driving the shutter 91. In FIG. 6, the shutter 9 is indicated by a thick two-dot-chain line. The shutter driving part 92 drives the shutter 91 to open the loading/unloading port 2x at the time of loading and unloading the substrate W with respect to the substrate cleaning device 1. In addition, the shutter driving part 92 drives the shutter 91 to block the loading/unloading port 2x at the time of performing a cleaning process of the substrate W in the substrate cleaning device 1.

The pedestal device 30 is provided at the central portion of the bottom surface portion 2a. The stage device 30 includes a linear guide 31, a movable pedestal 32, and a pedestal driving part 33. The linear guide 31 includes two rails, and is provided to extend in Y direction from the vicinity of the sidewall portion 2b to the vicinity of the sidewall part 2c in plan view. The movable pedestal 32 is provided on the two rails of the linear guide 31 to be movable in Y direction. The pedestal driving part 33 includes a pulse motor, for example, and moves the movable pedestal 32 in Y direction on the linear guide 31.

On the movable pedestal 32, the lower holding device 20 and the lower surface cleaning device 50 are provided to be side-by-side in Y direction. The lower holding device 20 includes a suction holding part 21 and a suction holding driving part 22. The suction holding part 21 is a so-called spin chuck, and is configured to have a circular suction surface able to suck and hold the lower surface of the substrate W and be rotatable about an axis (axis of Z direction) extending in the up-down direction. In FIG. 5, the outer shape of the substrate W sucked and held by the lower holding device 20 is indicated by a two-dot-chain line. In the following description, at the time when the substrate W is sucked and held by the suction holding part 21, a region of the lower surface of the substrate W which is supposed to be sucked by the suction surface of the suction holding part 21 is referred to as a lower surface central region. Meanwhile, a region of the lower surface of the substrate W surrounding the lower surface central region is referred to as a lower surface outer region.

The suction holding driving part 22 includes a motor. The motor of the suction holding driving part 22 is provided on the movable pedestal 32 so that the rotation shaft protrudes upward. The suction holding part 21 is installed to the upper end of the rotation shaft of the suction holding driving part 22. In addition, a suction path for sucking and holding the substrate W in the suction holding part 21 is formed in the rotation shaft of the suction holding driving part 22. The suction path is connected with an intake device not shown herein. The suction holding driving part 22 rotates the suction holding part 21 about the rotation shaft.

The lower surface cleaning device 50 includes a lower surface brush 51, two liquid nozzles 52, a gas ejection part 53, an elevation support part 54, a movement support part 54, a lower surface brush driving part 55a, a lower surface brush elevation driving part 55b, and a lower surface brush movement driving part 55c. The movement support part 55 is provided to be movable in Y direction with respect to the lower holding device 20 within a predetermined region on the movable pedestal 32. As shown in FIG. 6, the elevation support part 54 is provided to be able to raise and lower on the movement support part 55. The elevation support part 54 has an upper surface 54u inclined obliquely downward in a direction (rear in the embodiment) away from the suction holding part 21.

The lower surface brush 51 is formed by, for example, a polyvinyl alcohol (PVA) sponge or a PVA sponge dispersed with abrasive grains. As shown in FIG. 5, the lower surface brush 51 has a circular cleaning surface able to contact the lower surface of the substrate W. In addition, the lower surface brush 51 is installed to the upper surface 54u of the elevation support part 54, so that the cleaning surface faces upward and the cleaning surface is rotatable about an axis extending in the up-down direction through the center of the cleaning surface. The area of the cleaning surface of the lower surface brush 51 is greater than the area of the suction surface of the suction holding part 21.

Each of the two liquid nozzles 52 is installed onto the upper surface 54u of the elevation support part 54, so as to be positioned near the lower surface brush 51 and so that the liquid discharge port faces upward. A lower surface cleaning liquid supply part 56 (FIG. 7) is connected with the liquid nozzle 52. The lower surface cleaning liquid supply part 56 supplies a cleaning liquid to the liquid nozzle 52. At the time of cleaning the substrate W by using the lower surface brush 51, the liquid nozzle 52 supplies the cleaning liquid supplied from the lower surface cleaning liquid supply part 56 to the lower surface of the substrate W. In the embodiment, pure water (deionized water) is used as the cleaning liquid supplied to the liquid nozzle 52. In place of pure water, carbonated water, ozone water, hydrogen water, electrolytic ion water, a mixed solution of ammonia and hydrogen peroxide water (SC1), tetramethylammonium hydroxide (TMAH), or the like can also be used as the cleaning liquid supplied to the liquid nozzle 52.

The gas ejection part 53 is a gas ejection nozzle that is slit-like and has a gas ejection port extending in a direction. The gas ejection part 53 is installed to the upper surface 54u of the elevation support part 54, so as to be located between the lower surface brush 51 and the suction holding part 21 in plan view and so that the gas ejection port faces upward. An injection gas supply part 57 (FIG. 7) is connected with the gas ejection part 53. The ejection gas supply part 57 supplies a gas to the gas ejection part 53. In the embodiment, nitrogen gas is used as the gas supplied to the gas ejection part 53. At the time of cleaning the substrate W by using the lower surface brush 51 and at the time of drying the lower surface of the substrate W to be described afterwards, the gas ejection part 53 ejects the gas supplied from the ejection gas supply part 57 to the lower surface of the substrate W. In such case, a gas curtain in a belt shape extending in X direction is formed between the lower surface brush 51 and the suction holding part 21. In place of the nitrogen gas, inert gases such as argon gas or helium gas can also be used as the gas supplied to the gas ejection part 53.

The lower surface brush driving part 55a includes a motor, and rotates the lower surface brush 51 at the time of cleaning the substrate W by using the lower surface brush

51. The lower surface brush elevation driving part 55b includes a stepping motor or an air cylinder, and raises and lowers the elevation support part 54 with respect to the movement support part 55. The lower surface brush movement driving part 55c includes a motor, and moves the movement support part 55 in Y direction on the movable pedestal 32. Here, the position of the lower holding device 20 is fixed in the movable pedestal 32. Therefore, at the time of moving the movement support part 55 in Y direction by using the lower surface brush movement driving part 55c, the movement support part 55 moves relatively with respect to the lower side holding part 20. In the following description, a position of the lower surface cleaning device 50 closest to the lower holding device 20 on the movable pedestal 32 is referred to as a close position, and a position of the lower surface cleaning device 50 furtherest from the lower holding device 20 on the movable pedestal 32 is referred to as a separation position.

A cup device 60 is further provided at the central portion of the bottom surface portion 2a. The cup device 60 includes a processing cup 61 and a cup driving part 62. The processing cup 61 is provided so as to surround the lower holding device 20 and the pedestal device 30 in plan view and can be raised and lowered. In FIG. 6, the processing cup 61 is indicated by a dot line. The cup driving part 62 moves the processing cup 61 between a lower cup position and an upper cup position in accordance with which portion in the lower surface of the substrate W is to be cleaned by the lower surface brush 51. The lower cup position is a position of the height of the processing cup 61 at the time when the upper end of the processing cup 61 is located below the substrate W sucked and held by the suction holding part 21. In addition, the upper cup position is a position of the height of the processing cup 61 at the time when the upper end of the processing cup 61 is above the suction holding part 21.

At a position higher than the processing cup 61, a pair of upper holding devices 10A, 10B are provided, so as to sandwich the pedestal device 30 and face each other in plan view. The upper holding device 10A includes a lower chuck 11A, an upper chuck 12A, a lower chuck driving part 13A and an upper chuck driving part 14A. The upper holding device 10B includes a lower chuck 11B, an upper chuck 12B, a lower chuck driving part 13B and an upper chuck driving part 14B.

The lower chucks 11A, 11B are disposed symmetrically with respect to a vertical plane passing through the center of the suction holding part 21 in plan view and extending in Y direction (front-rear direction), and are movable in X direction within a common horizontal plane. Each of the lower chucks 11A, 11B has two support pieces able to support the lower surface edge part of the substrate W from a lower part of the substrate W. The lower chuck driving parts 13A, 13B move the lower chucks 11A, 11B so that the lower chucks 11A, 11B approach each other or so that the lower chucks 11A, 11B move away from each other.

Like the lower chucks 11A, 11B, the upper chucks 12A, 12B are disposed symmetrically with respect to a vertical plane passing through the center of the suction holding part 21 in plan view and extending in Y direction (front-rear direction), and are movable in X direction within a common horizontal plane. Each of the upper chucks 12A, 12B has two holding pieces configured to contact two portions of the outer peripheral end of the substrate W to be able to hold the outer peripheral end of the substrate W. The upper chuck driving parts 14A, 14B move the upper chucks 12A, 12B so that the upper chucks 12A, 12B approach each other or so that the upper chucks 12A, 12B move away from each other.

As shown in FIG. 5, the upper surface cleaning device 70 is provided on a side of the processing cup 61, so as to be located near the upper holding device 10B in plan view. The upper surface cleaning device 70 includes a rotation support shaft 71, an arm 72, a spray nozzle 73, and an upper surface cleaning driving part 74.

The rotation support shaft 71 is supported on the bottom surface portion 2a by the upper surface cleaning driving part 74, so as to extend in the up-down direction and to be able to be raised, lowered and rotated. As shown in FIG. 6, the arm 72 is provided at a position above the upper holding device 10B so as to extend in the horizontal direction from the upper end of the rotation support shaft 71. The spray nozzle 73 is installed to the tip end of the arm 72.

A upper surface cleaning fluid supply part 75 (FIG. 7) is connected with the spray nozzle 73. The upper surface cleaning fluid supply part 75 supplies a cleaning liquid and a gas to the spray nozzle 73. In the embodiment, pure water is used as the cleaning liquid supplied to the spray nozzle 73, and nitrogen gas is used as the gas supplied to the spray nozzle 73. At the time of cleaning the upper surface of the substrate W, the spray nozzle 73 generates a mixed fluid by mixing the cleaning liquid and the gas supplied from the upper surface cleaning fluid supply part 75 and ejects the generated mixed fluid downward.

In place of pure water, carbonated water, ozone water, hydrogen water, electrolytic ion water, a mixed solution of ammonia and hydrogen peroxide water (SC1), tetramethyl-ammonium hydroxide (TMAH), or the like can also be used as the cleaning liquid supplied to the spray nozzle 73. In addition, as the gas supplied to the spray nozzle 73, in place of the nitrogen gas, inert gases such as argon gas or helium gas can also be used.

The upper surface cleaning driving part 74 includes one or more pulse motors, air cylinders, etc., raises/lowers the rotation support shaft 71, and rotates the rotation support shaft 71. According to the above configuration, by moving the spray nozzle 73 in an arc-like manner on the upper surface of the substrate W sucked and held by the suction holding part 21 to be rotated, the entirety of the upper surface of the substrate W can be cleaned.

As shown in FIG. 5, the end cleaning device 80 is provided on the other side of the processing cup 61, so as to be located near the upper holding device 10A in plan view. The end cleaning device 80 includes a rotation support shaft 81, an arm 82, a bevel brush 83, and a bevel brush driving part 84.

The rotation support shaft 81 is supported on the bottom surface portion 2a by the bevel brush driving part 84, so as to extend in the up-down direction and to be able to be raised, lowered and rotated. As shown in FIG. 6, the arm 82 is provided at a position above the upper holding device 10A so as to extend in the horizontal direction from the upper end of the rotation support shaft 81. The bevel brush 83 is provided at the tip end of the arm 82, so as to protrude downward and be rotatable about an axis in the up-down direction.

The bevel brush 83 is formed by, for example, a PVA sponge or a PVA sponge dispersed with abrasive grains. The upper half of the bevel brush 83 has an inverted truncated cone shape, and the lower half thereof has a truncated cone shape. According to the bevel brush 83, the outer peripheral end of the substrate W can be cleaned by using the central portion of the outer peripheral surface in the up-down direction.

The bevel brush driving part 84 includes one or more pulse motors, air cylinders, etc., raises the rotation support shaft 81, and rotates the rotation support shaft 81. According to the above configuration, by bringing the central portion of the outer peripheral surface of the bevel brush 83 into contact with the outer peripheral end of the substrate W sucked and held by the suction holding part 21 to be rotated, the entirety of the outer peripheral end of the substrate W can be cleaned.

Here, the bevel brush driving part 84 further includes a motor built in the arm 82. The motor rotates the bevel brush 83 provided at the tip end of the arm 82 about an axis in the up-down direction. Therefore, at the time of cleaning the outer peripheral end of the substrate W, the cleaning capability of the bevel brush 83 for the outer peripheral end of the substrate W can be facilitated by rotating the bevel brush 83.

<3> Control System of the Substrate Processing Device

Figure 7:
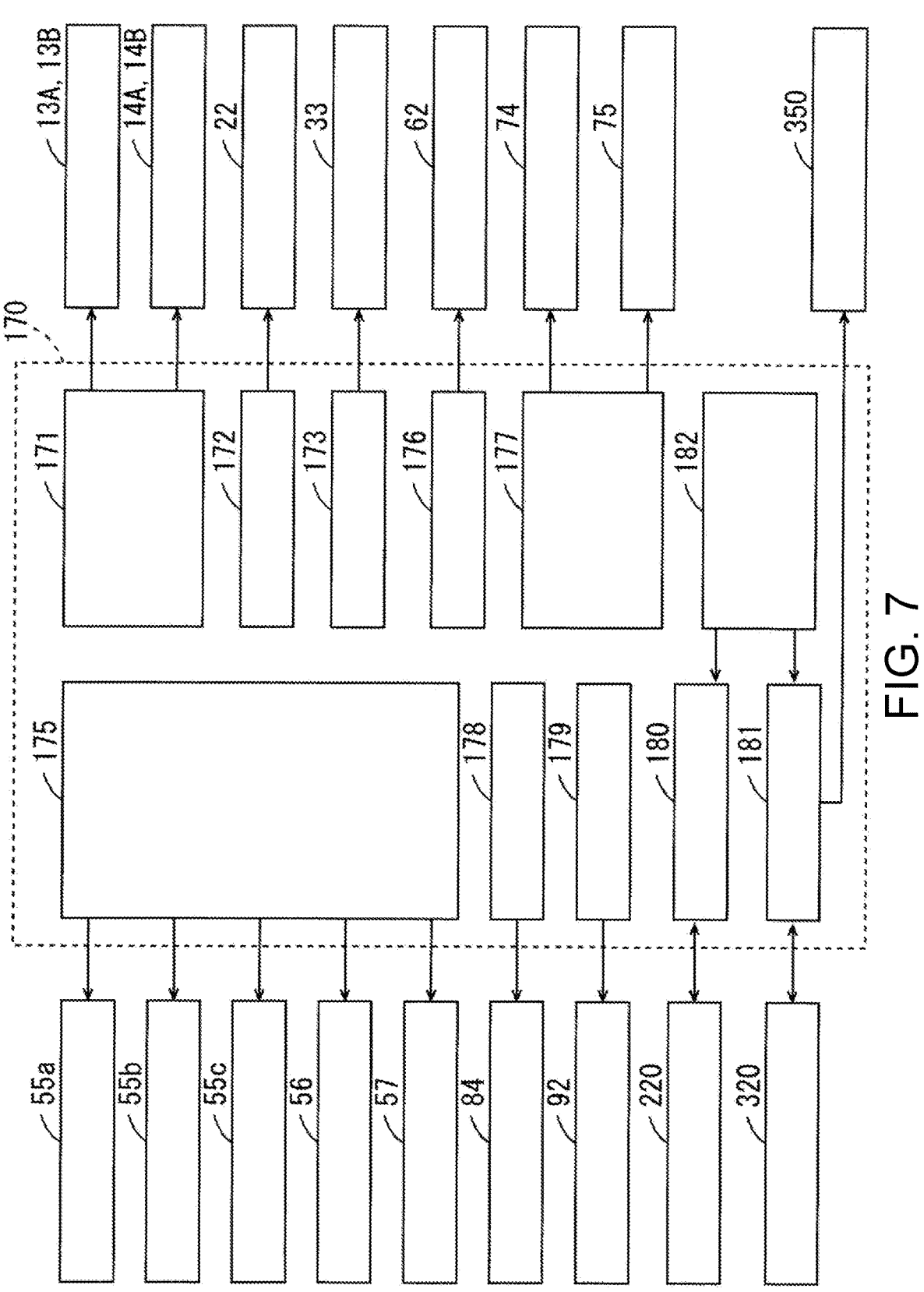
FIG. 7 is a block diagram illustrating a configuration of a control system of the substrate processing device of FIG. 1.

FIG. 7 is a block diagram illustrating a configuration of a control system of the substrate processing device 100 of FIG. 1. As described above, the control device 170 of FIG. 1 includes a CPU, a RAM, a ROM, and a storage device. The RAM is used as the operation area of the CPU. The ROM stores a system program. The storage device stores a substrate processing program.

As shown in FIG. 7, as functional parts, the control device 170 includes a chuck control part 171, a suction control part 172, a pedestal control part 173, a lower surface cleaning control part 175, a cup control part 176, an upper surface cleaning control part 177, a bevel cleaning control part 178, a loading/unloading control part 179, transportation control parts 180, 181, and a position information storage part 182. The functional parts of the control device 170 are realized by executing the substrate processing program stored in the storage device in the RAM by using the CPU. Some or all of the functional parts of the control device 170 may also be realized as hardware such as electronic circuits.

The chuck control part 171, the suction control part 172, the pedestal control part 173, the lower surface cleaning control part 175, the cup control part 176, the upper surface cleaning control part 177, the bevel cleaning control part 178, and the loading/unloading control part 179 control the operation of each substrate cleaning device 1. Specifically, the chuck control part 171 controls the lower chuck driving parts 13A, 13B and the upper chuck driving parts 14A, 14B to receive the substrate W loaded into each substrate cleaning device 1 and hold the substrate W at a position above the suction holding part 21.

The suction control part 172 controls the suction holding driving part 22 to suck and hold the substrate W by using the suction holding part 21 and rotate the substrate W that is sucked and held. The pedestal control part 173 controls the pedestal driving part 33 to move the movable pedestal 32 with respect to the substrate W held by the upper holding devices 10A, 10B.

The lower surface cleaning control part 175 controls the lower surface brush rotation driving part 55a, the lower surface brush elevation driving part 55b, the lower surface brush movement driving part 55c, the lower surface cleaning liquid supply part 56, and the ejection gas supply part 57 to clean the lower surface of the substrate W. The cup control part 176 controls the cup driving part 62 to receive the cleaning liquid scattering from the substrate at the time of cleaning the substrate W sucked and held by the suction holding part 21 by using the processing cup 61.

The upper surface cleaning control part 177 controls the upper surface cleaning driving part 74 and the upper surface cleaning fluid supply part 75 to clean the upper surface of the substrate W sucked and held by the suction holding part 21. The bevel cleaning control part 178 controls the bevel brush driving part 84 to clean the outer peripheral end of the substrate W sucked and held by the suction holding part 21. The loading/unloading control part 179 controls the shutter driving part 92 to open and close the loading/unloading port 2x of the unit housing 2 at the time of loading and unloading the substrate W in each substrate cleaning device 1.

In the substrate processing device 100, a reception position where the transportation robot transporting the substrate W receives the substrate W from other components can be represented by using coordinates of a coordinate system (referred to as "device coordinate system" in the following) defined for the entire substrate processing device 100. In addition, a transfer position where the transportation robot transfers (mounts) the substrate W to other components can also be represented by using the coordinates of the device coordinate system. In the embodiment, the transportation robot is the indexer robot 200 and the main robot 300.

In the position information storage part 182, the coordinates of multiple reception positions set in advance in the substrate processing device 100 are stored as the position information. The coordinates of the multiple reception positions include the coordinates of the first processing position. Also, in the position information storage part 182, the coordinates of multiple transfer positions set in advance in the substrate processing device 100 are stored as the position information. The coordinates of the multiple transfer positions include the coordinates of the second processing position.

The transportation driving part 220 of FIG. 1, for example, includes multiple encoders or multiple driving pulse generation parts, etc., and is configured to be able to output signals corresponding to the operation amount of the hand support member 210 and the operation amounts of the respective hands Ia to Id. Accordingly, the transportation control part 180 can grasp the coordinate position of each of the hands Ia to Id in the device coordinate system based on the output signal from the transportation driving part 220. Accordingly, the transportation control part 180 controls the transportation driving part 220, so as to transport the substrates W between the carriers C and the substrate placement parts PASS1, PASS2 based on the coordinate positions of the respective hands Ia to Id that are grasped and the position information stored in the position information storage part 182.

The transportation driving part 320 of FIG. 1, for example, includes multiple encoders or multiple driving pulse generation parts, etc., and is configured to be able to output signals corresponding to the operation amount of the hand support member 310 and the operation amounts of the respective hands Ma to Md. Accordingly, the transportation control part 181 can grasp the coordinate position of each of the hands Ma to Md in the device coordinate system based on the output signal from the transportation driving part 320. Accordingly, the transportation control part 181 controls the transportation driving part 320, so as to transport the substrates W between the substrate placement parts PASS1, PASS2 and the substrate cleaning devices 1 based on the coordinate positions of the respective hands Ma to Md that are grasped and the position information stored in the position information storage part 182. In addition, the transportation control part 181 controls the transportation driving part 320, so as to transport the substrate W between the first processing position and the second processing position in each substrate cleaning device 1. In addition, the transportation control part 181 controls the operation of the fixing device 350 of FIG. 3 provided in each of the hands Ma to Md.

In the example of FIG. 7, the control device 170 controls the operations of the substrate cleaning devices 1 in addition to the operations of the indexer robot 200 and the main robot 300. However, the embodiment is not limited thereto. Each substrate cleaning device 1 may also be provided with a control device for controlling the operation of such substrate cleaning device 1. In such case, it may also be that the control device 170 does not include the chuck control part 171, the suction control part 172, the pedestal control part 173, the lower surface cleaning control part 175, the cup control part 176, the upper surface cleaning control part 177, the bevel cleaning control part 178, and the loading/unloading control part 179.

<4> the First Processing Position and Second Processing Position

Figures 8A, 8B, 8C:
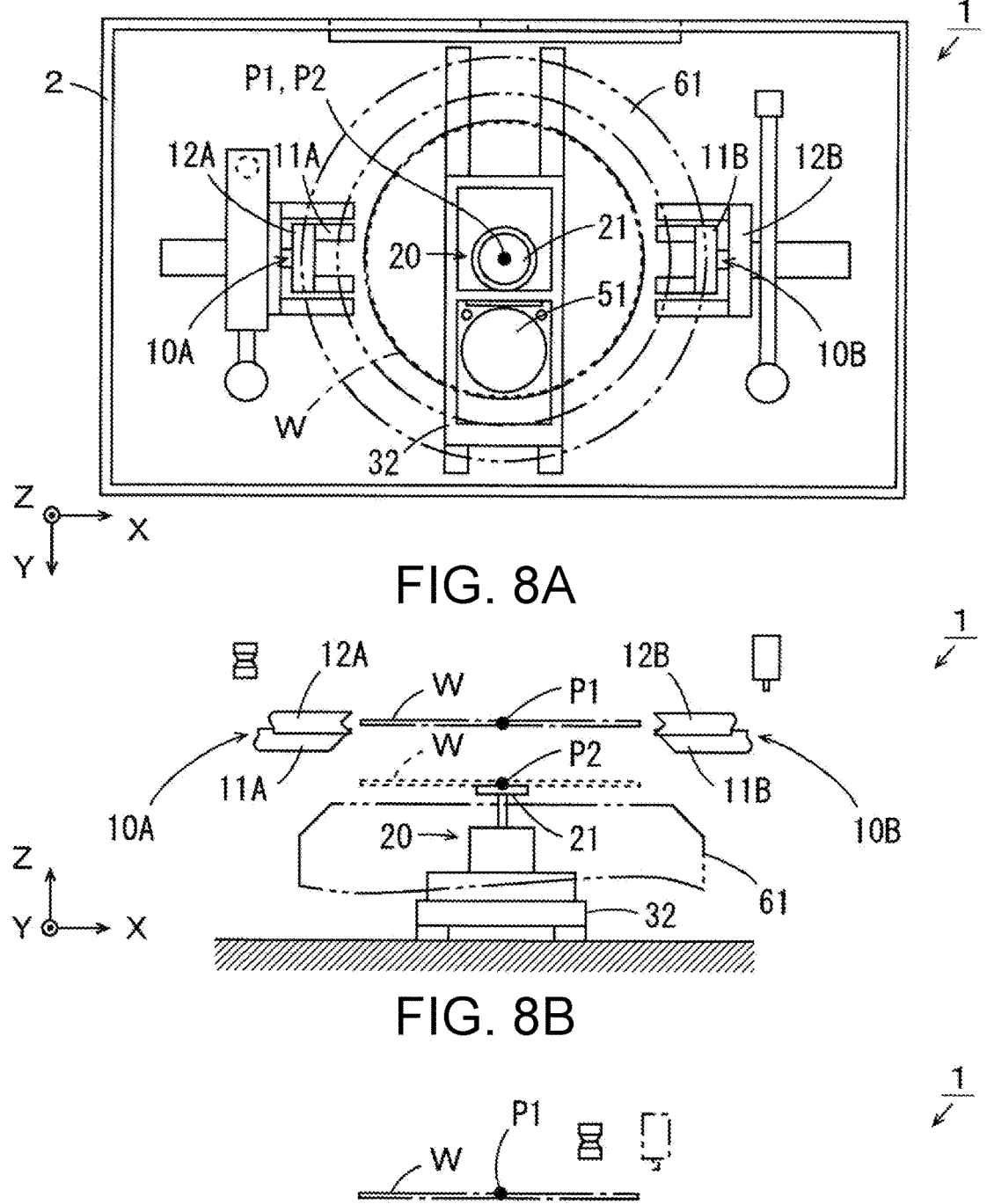
FIGS. 8A to 8C are views illustrating a first processing position and a second processing position in the substrate cleaning device.

FIGS. 8A to 8C are views illustrating the first processing position and the second processing position in the substrate cleaning device 1. In FIGS. 8A to 8C, FIG. 8A illustrate plan views of the substrate cleaning device 1. In addition, FIG. 8B illustrate side views of the lower holding device 20 and the peripheral part thereof when viewed along Y direction, and the lower part illustrates a side view of the lower holding device 20 and the peripheral part thereof along X direction. The side view of FIG. 8B corresponds to a side view taken along a line A-A of FIG. 5, and the side view of the lower part corresponds to a side view taken along a line B-B of FIG. 5. It is noted that, for the ease of understanding the shapes and the operation states of the respective components in the substrate cleaning device 1, the scales of some of the components are different between the plan view in FIG. 8A and the side views in FIGS. 8B and 8C.

In each view of FIGS. 8A to 8C, the outer shape of the substrate W disposed at the first processing position is indicated by a dot-chain line, and the central position of the substrate W disposed at the first processing position is indicated by a dot labeled with a symbol P1 as the first processing position. Also, in each view of FIGS. 8A to 8C, the outer shape of the substrate W disposed at the second processing position is indicated by a dot line, and the central position of the substrate W disposed at the second processing position is indicated by a dot labeled with a symbol P2 as the second processing position.

As shown in FIG. 8A, the first processing P1 matches the second processing position P2 in plan view. Therefore, in the plan view of FIG. 8A, the outer shape of the substrate W disposed at the first processing position P1 matches the outer shape of the substrate W disposed at the second processing position P2. In addition, the central positions of the substrate W disposed at the first processing position P1 and the second processing position P2 are set to match the central position of the processing cup 61 (a plane reference position rap of FIG. 9A to be described in the following) in plan view.

Meanwhile, as indicated in FIGS. 8B and 8C, the first processing position P1 is at a height position equal to the upper holding devices 10A, 10B in side view. In other words, the first processing position P1 is set at a height position of the substrate W held by the upper holding devices 10A, 10B. In addition, as indicated in FIGS. 8B and 8C, the second processing position P2 is at a height position equal to the suction holding part 21 of the lower holding device 20 in side view. In other words, the second processing position P2 is set at a height position of the substrate W held by the lower holding device 20.

<5> Operations of the Substrate Cleaning Device 1 and the Main Robot 300

In the substrate cleaning devices 1, the cleaning processes for the substrates W respectively transported by the hands Ma to Md of the main robot 300 of FIG. 1 are performed in order. In the following, the operation of the substrate cleaning device 1 for the substrate W transported by the hand Ma is described. However, the operations of the substrate cleaning devices 1 for the substrates W transported by the hands Mb to Md are the same as the operation of the substrate cleaning device 1 for the substrate W transported by the hand Ma.

FIGS. 9A to 22C are schematic views illustrating an example of the operations of the substrate cleaning device 1 of FIG. 5 and the main robot 300 of FIG. 1. Like the example of FIGS. 8A to 8C, in each of FIGS. 9A to 22C, FIGS. 9A to 22A illustrate plan views of the substrate cleaning device 1. In addition, FIGS. 9B to 22B illustrate side views of the lower holding device 20 and the peripheral part thereof when viewed along Y direction, and FIG. 9C to 22C illustrate side views of the lower holding device 20 and the peripheral part thereof along X direction. The side views of FIGS. 9B to 22B correspond to side views taken along a line A-A of FIG. 5, and the side views of FIGS. 9C to 22C correspond to side views taken along a line B-B of FIG. 5. It is noted that, for the ease of understanding the shapes and the operation states of the respective components in the substrate cleaning device 1, the scales of some of the components are different between the plan view in FIGS. 8A to 22A and the side views in FIGS. 8B to 22B and FIGS. 8C to 22C. Also, in FIGS. 9A to 22C, the processing cup 61 is indicated by a two-dot-chain line, and the outer shape of the substrate W is indicated by a thick dot-chain line.

In an initial state before the substrate W is loaded into the substrate cleaning device 1, the shutter 91 of the opening/closing device 90 blocks the loading/unloading port 2x. In addition, as shown in FIG. 5, the lower chucks 11A, 11B are maintained in a state in which the distance between the lower chucks 11A, 11B is sufficiently longer than the diameter of the substrate W. In addition, the upper chucks 12A, 12B are also maintained in a state in which the distance between the upper chucks 12A, 12B is sufficiently longer than the diameter of the substrate W. In addition, the movable pedestal 32 of the pedestal device 32 is disposed so that the center of the suction holding part 21 is located at the center of the processing cup 61 in plan view. In addition, on the movable pedestal 32, the lower surface cleaning device 50 is disposed at the close position. In addition, the elevation support part 54 of the lower surface cleaning device 50 is in a state in which the cleaning surface (upper end) of the lower surface brush 51 is located below the suction holding part 21. In addition, in the cup device 60, the processing cup 61 is at a lower cup position. In the following description, the central position of the processing cup 61 in plan view is referred to as the plane reference position rp. The position of the movable pedestal 32 on the bottom surface 2a at the time when the center of the suction holding part 21 is at the plane reference position rp in plan view is referred to as a first pedestal position.

Figures 9A, 9B, 9C:
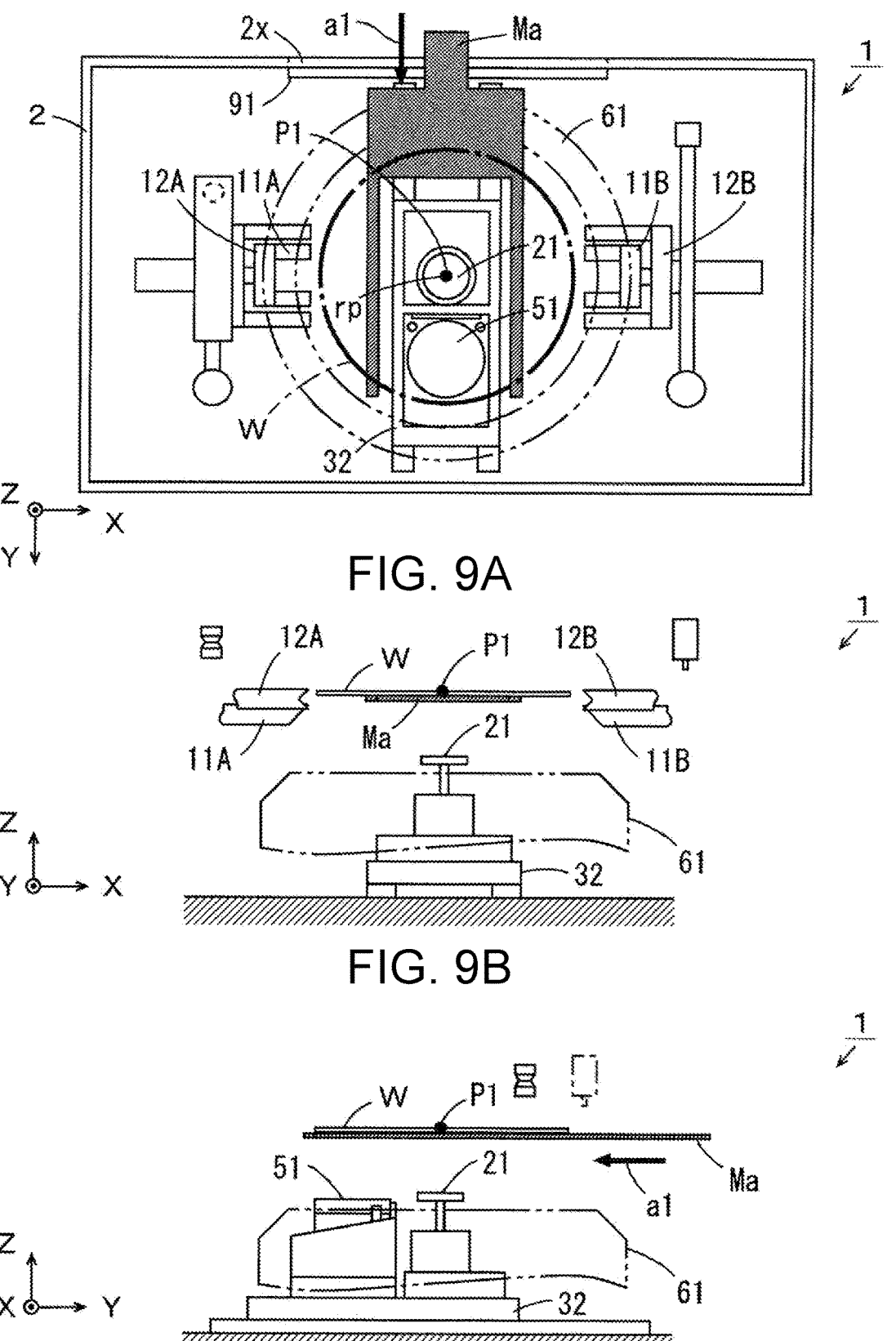
FIGS. 9A to 9C are schematic views illustrating an example of the operation of the substrate cleaning device of FIG. 5 and a main robot of FIG. 1.

The substrate W not yet processed is loaded into the unit housing 2 of the substrate cleaning device 1. Specifically, the shutter 91 opens the loading/unloading port 2x immediately before the substrate W is loaded. Then, as indicated by an arrow sign a1 of a thick solid line in FIGS. 9A to 9C, the hand Ma of the main robot 300 of FIG. 1 enters the unit housing 2 through the loading/unloading port 2x and moves the substrate W to the substantially central position in the unit housing 2. At this time, the substrate W held by the hand Ma, as shown in FIGS. 9A to 9C, is positioned at the first processing position P1 between the lower chuck 11A as well as the upper chuck 12A and the lower chuck 11B as well as the upper chuck 2B.

Here, at the time of transporting the substrate W by using the hand Ma, the substrate W is fixed to a hand reference position by using the fixing device 350 of FIG. 3. In such case, no position displacement of the substrate W with respect to the hand Ma is generated at the time of transporting the substrate W. Therefore, the substrate W transported by the hand Ma is accurately positioned at the first processing position P1 based on the coordinate position of the hand Ma and the position information of the first processing position P1.

Figures 10A, 10B, 10C:
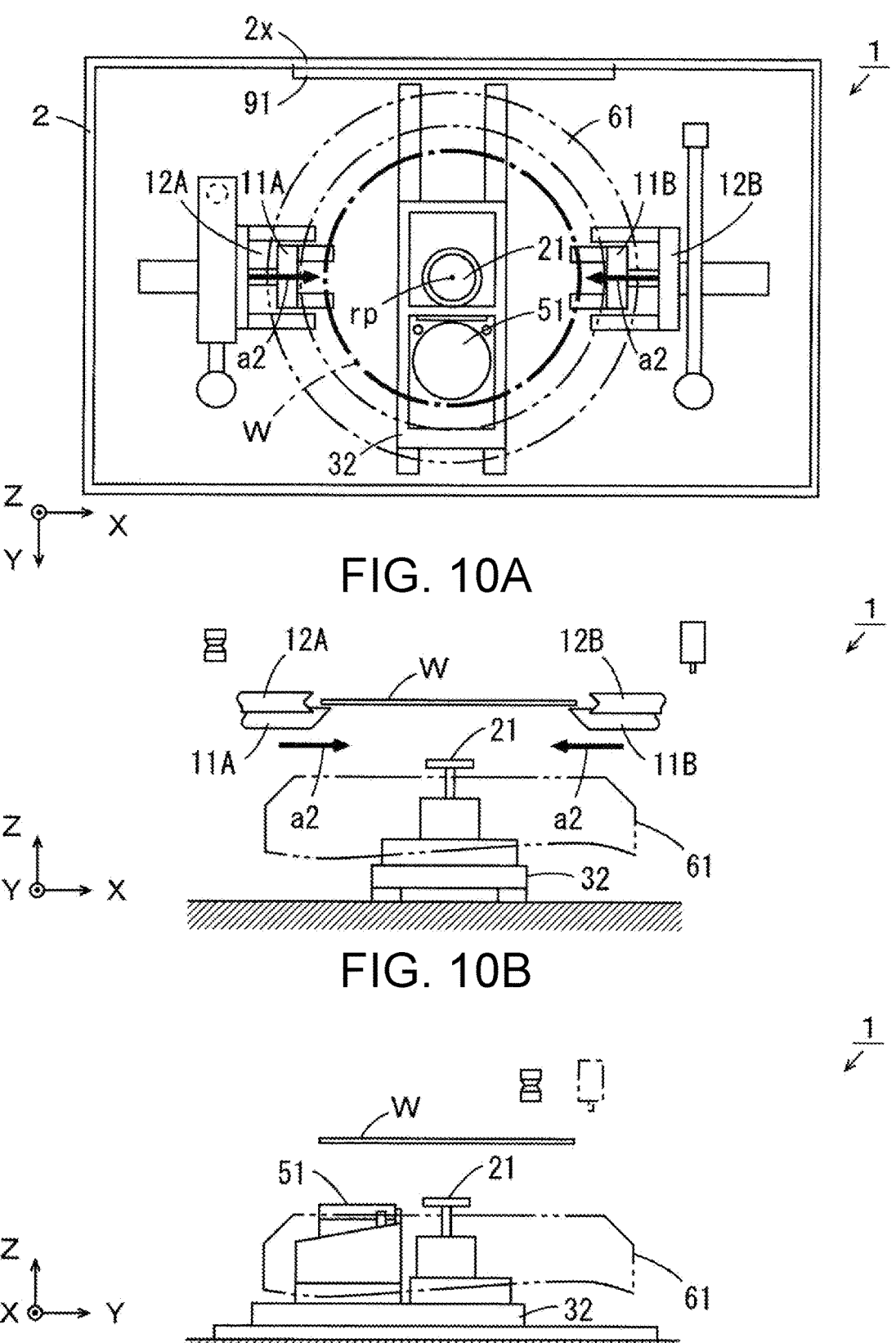
FIGS. 10A to 10C are schematic views illustrating an example of the operation of the substrate cleaning device of FIG. 5 and a main robot of FIG. 1.

Then, as indicated by an arrow sign a2 of a thick solid line in FIGS. 10A and 10B, the lower chucks 11A, 11B approach each other, so that the support pieces of the lower chucks 11A, 11B are located below the lower surface edge part of the substrate W. In such state, the fixing state of the substrate W by the fixing device 350 in the hand Ma is removed. In addition, the hand Ma is lowered. Accordingly, multiple portions of the lower surface edge part of the substrate W held by the hand Ma are supported by the support pieces of the lower chucks 11A, 11B. Then, the hand Ma leaves the unit housing 2. After the hand Ma leaves, the shutter 91 blocks the loading/unloading port 2x.

Figures 11A, 11B, 11C:
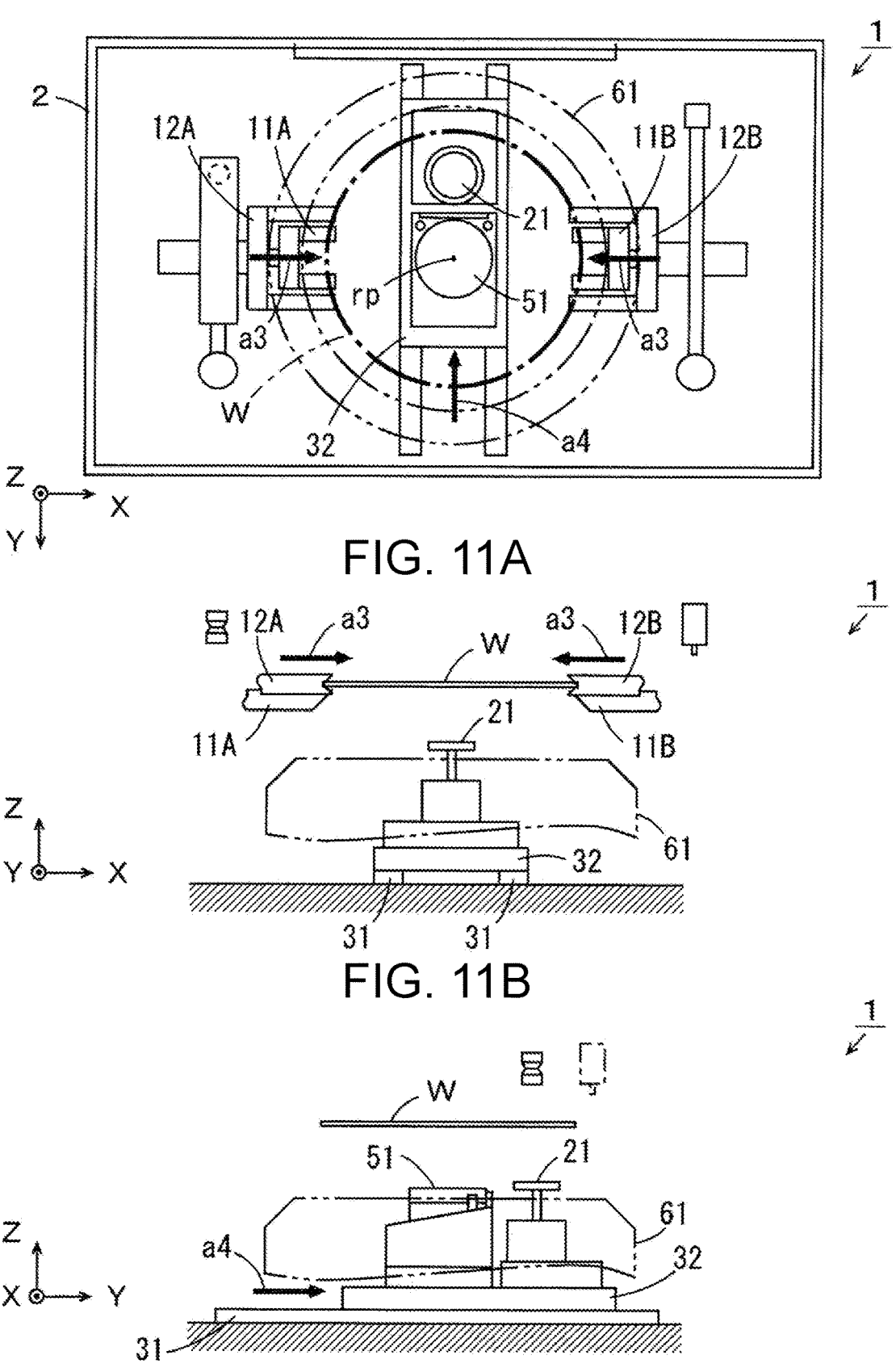
FIGS. 11A to 11C are schematic views illustrating an example of the operation of the substrate cleaning device of FIG. 5 and a main robot of FIG. 1.

Then, as indicated by an arrow sign a3 of a thick solid line in FIGS. 11A and 11B, the upper chucks 12A, 12B approach each other, so that the support pieces of the upper chucks 12A, 12B contact the outer peripheral end of the substrate W. By bringing the support pieces of the upper chucks 12A, 12B into contact with portions of the outer peripheral end of the substrate W, the substrate W supported by the lower chucks 11A, 11B are further held by the upper chucks 12A, 12B. In this way, the center of the substrate W held by the upper holding devices 10A, 10B is overlapped with or substantially overlapped with the plane reference position rp in plan view. In addition, as indicated by an arrow sign a4 of a thick solid line in FIG. 11A, the movable pedestal 32 moves forward from the first pedestal position, so that the suction holding part 21 is displaced from the plane reference position rp by a predetermined distance and the center of the lower surface brush 51 is located at the plane reference position rp. At this time, the position of the movable pedestal 32 located on the bottom surface portion 2a is referred to as a second pedestal position.

Figures 12A, 12B, 12C:
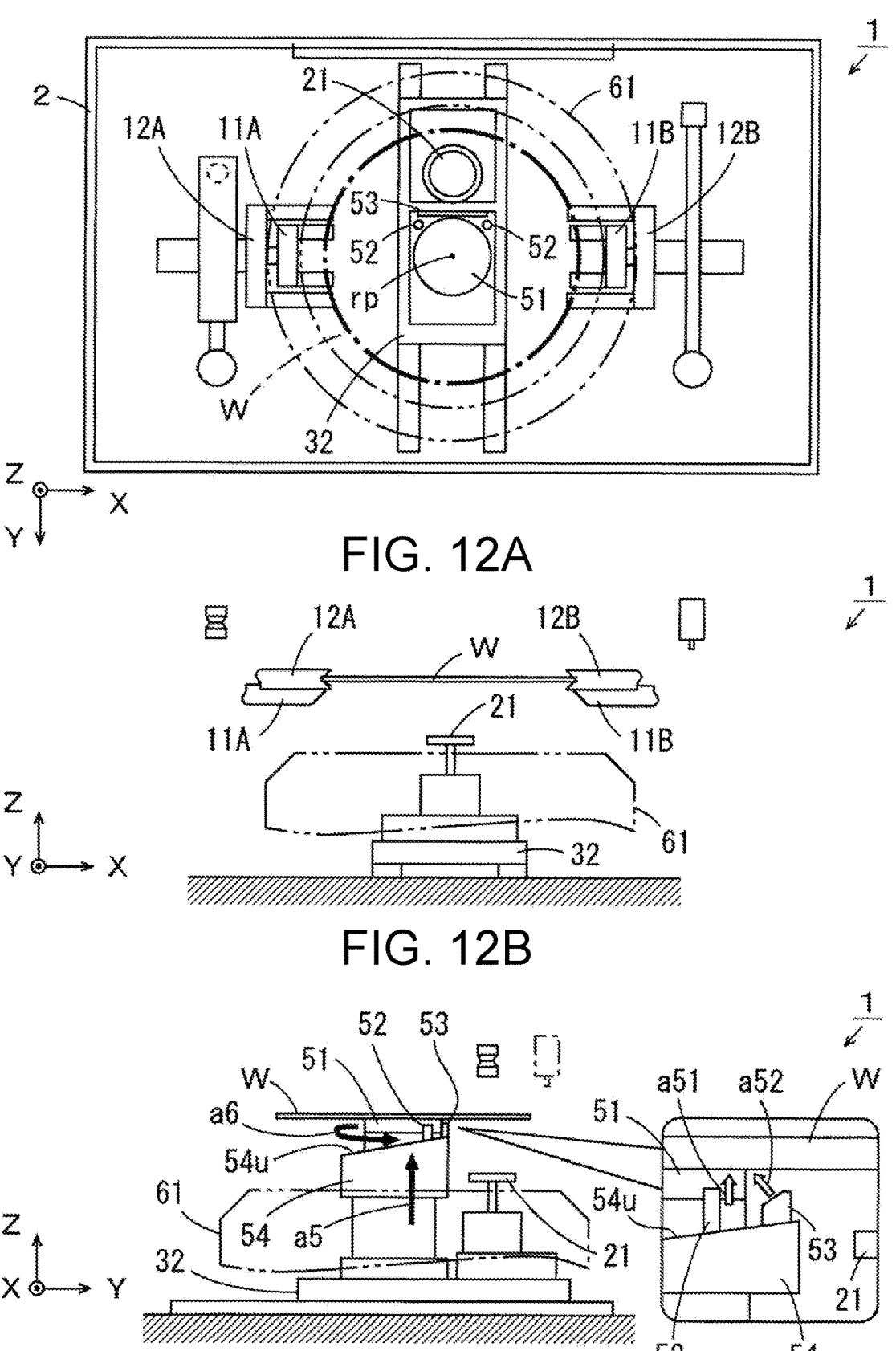
FIGS. 12A to 12C are schematic views illustrating an example of the operation of the substrate cleaning device of FIG. 5 and a main robot of FIG. 1.

Then, as indicated by an arrow sign a5 of a thick solid line in FIG. 12C, the elevation support part 54 is raised so that the cleaning surface of the lower surface brush 51 contacts the lower surface central region of the substrate W. In addition, as indicated by an arrow sign a6 of a thick solid line in FIG. 12C, the lower surface brush 51 rotates about an axis in the up-down direction. Accordingly, contaminants adhered to the lower surface central region of the substrate W are physically removed by the lower surface brush 51.

In FIG. 12C, an enlarged side view of the portion where the lower surface brush 51 contacts the lower surface of the substrate W is shown in a balloon. As shown in the balloon, in the state in which the lower surface brush 51 contacts the substrate W, the liquid nozzle 52 and the gas ejection part 53 are held at positions close to the lower surface of the substrate W. At this time, the liquid nozzle 52, as indicated by a white arrow sign a51, discharges the cleaning liquid toward the lower surface of the substrate W at a position near the lower surface brush 51. Accordingly, the cleaning liquid supplied to the lower surface of the substrate W from the liquid nozzle 52 is guided to the contact part between the lower surface brush 51 and the substrate W, thereby washing away the contaminants removed from the back surface of the substrate W by the lower surface brush 51 by using the cleaning liquid. In this way, in the lower surface cleaning device 50, the liquid nozzle 52, together with the lower surface brush 51, is installed to the elevation support part 54. Accordingly, the cleaning liquid can be efficiently supplied to the cleaning portion of the lower surface of the substrate W by the lower surface brush 51. Therefore, the consumption of the cleaning liquid is reduced, and the excessive scattering of the cleaning liquid is suppressed.

It is noted that the rotation speed of the lower surface brush 541 at the time of cleaning the lower surface of the substrate W is maintained at a speed that the cleaning liquid supplied from the liquid nozzle 52 to the lower surface of the substrate W does not scatter to the lateral side of the lower surface brush 51.

Here, the upper surface 54*u* of the elevation support part 54 is inclined obliquely downward in a direction away from the suction holding part 21. In such case, when the cleaning liquid containing the contaminants from the lower surface of the substrate W drops onto the elevation support part 54, the cleaning liquid received by the upper surface 54*u* is guided toward a direction away from the suction holding part 21.

In addition, at the time of cleaning the lower surface of the substrate W by the lower surface brush 51, the gas injection part 53 ejects a gas toward the lower surface of the substrate W at a position between the lower surface brush 51 and the suction holding part 21, as indicated by a white arrow sign a52 in the balloon of FIG. 12C. In the embodiment, the gas ejection part 53 is installed to the elevation support part 54 so that the gas ejection port extends in X direction. In such case, at the time of ejecting gas from the gas ejection part 53 to the lower surface of the substrate W, a belt-like gas curtain extending in X direction is formed between the lower surface brush 51 and the suction holding part 21. Accordingly, at the time of cleaning the lower surface of the substrate W by the lower surface brush 51, the cleaning liquid containing the contaminants is prevented from scattering toward the suction holding part 21. Therefore, at the time of cleaning the lower surface of the substrate W by the lower surface brush 51, the cleaning liquid containing the contaminants is prevented from being attached to the suction holding part 21, and the suction surface of the suction holding part 21 remains clean.

It is noted that, in the example of FIGS. 12A to 12C, the gas ejection part 53 ejects the gas obliquely upward from the gas ejection part 53 toward the lower surface brush 51, as indicated by the white arrow sign a52. However, the disclosure is not limited thereto. The gas ejection part 53 may also eject gas along Z direction from the gas ejection part 53 toward the lower surface of the substrate W.

Then, in the state of FIGS. 12A to 12C, when the cleaning of the lower surface central region of the substrate W is completed, the rotation of the lower surface brush 51 is stopped, and the elevation support part 54 is lowered so that the cleaning surface of the lower surface brush 51 is separated from the substrate W by a predetermined distance. In addition, the discharge of the cleaning liquid from the liquid nozzle 52 toward the substrate W is stopped. At this time, the gas ejection from the gas ejection part 53 toward the substrate W continues.

Figures 13A, 13B, 13C:
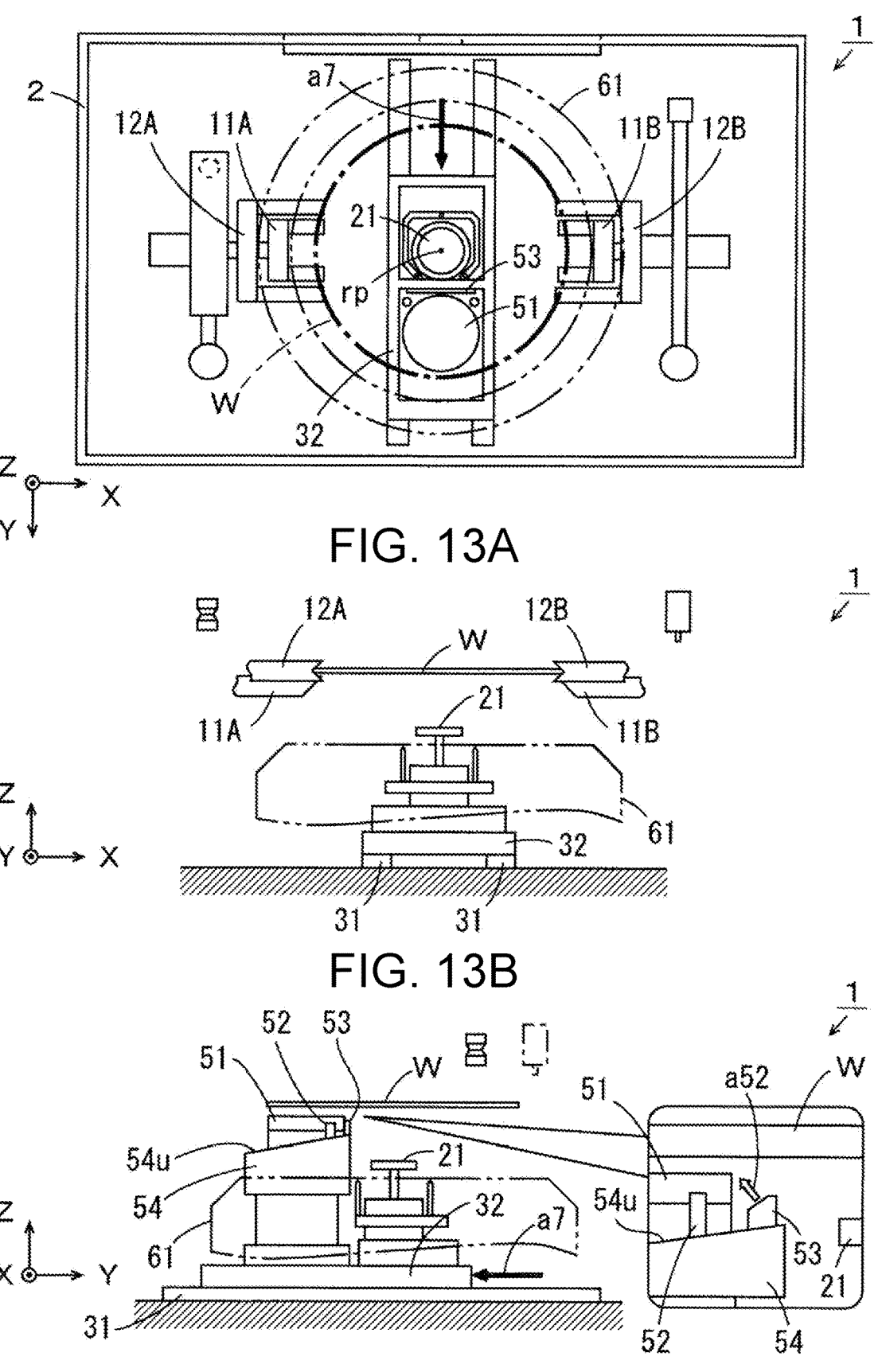
FIGS. 13A to 13C are schematic views illustrating an example of the operation of the substrate cleaning device of FIG. 5 and the main robot of FIG. 1.

Then, as indicated by an arrow sign a7 of a thick solid line in FIG. 13A, the movable pedestal 32 moves rearward, so that the suction holding part 21 is located at the plane reference position rp. That is, the movable pedestal 32 moves from the second pedestal position to the first pedestal position. At this time, by continuing ejecting the gas from the gas ejection part 53 toward the substrate W, the lower surface central region of the substrate W is dried in order by the gas curtain.

Figures 14A, 14B, 14C:
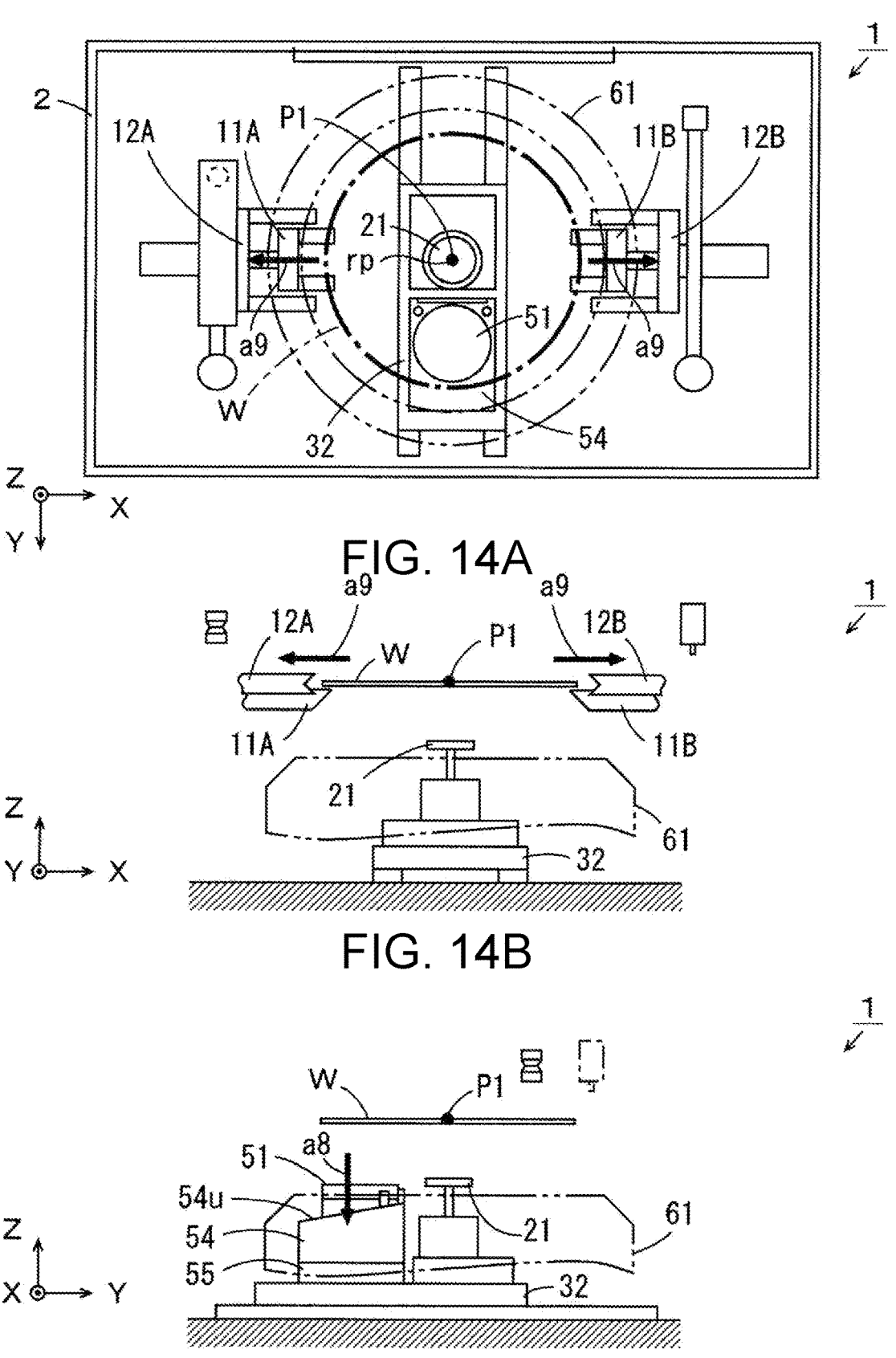
FIGS. 14A to 14C are schematic views illustrating an example of the operation of the substrate cleaning device of FIG. 5 and the main robot of FIG. 1.

Then, as indicated by an arrow sign a8 of a thick solid line in FIG. 14C, the elevation support part 54 is lowered, so that the cleaning surface of the lower surface brush 51 is located below the suction surface (upper end) of the suction holding part 21. In addition, as indicated by an arrow sign a9 of a thick solid line in FIGS. 14A and 14B, the upper chucks 12A, 12B move away from each other, so that the support pieces of the upper chucks 12A, 12B are separated from the outer peripheral end of the substrate W. At this time, the substrate W is in a state of being supported by the lower chucks 11A, 11B at the first processing position P1.

Figures 15A, 15B, 15C:
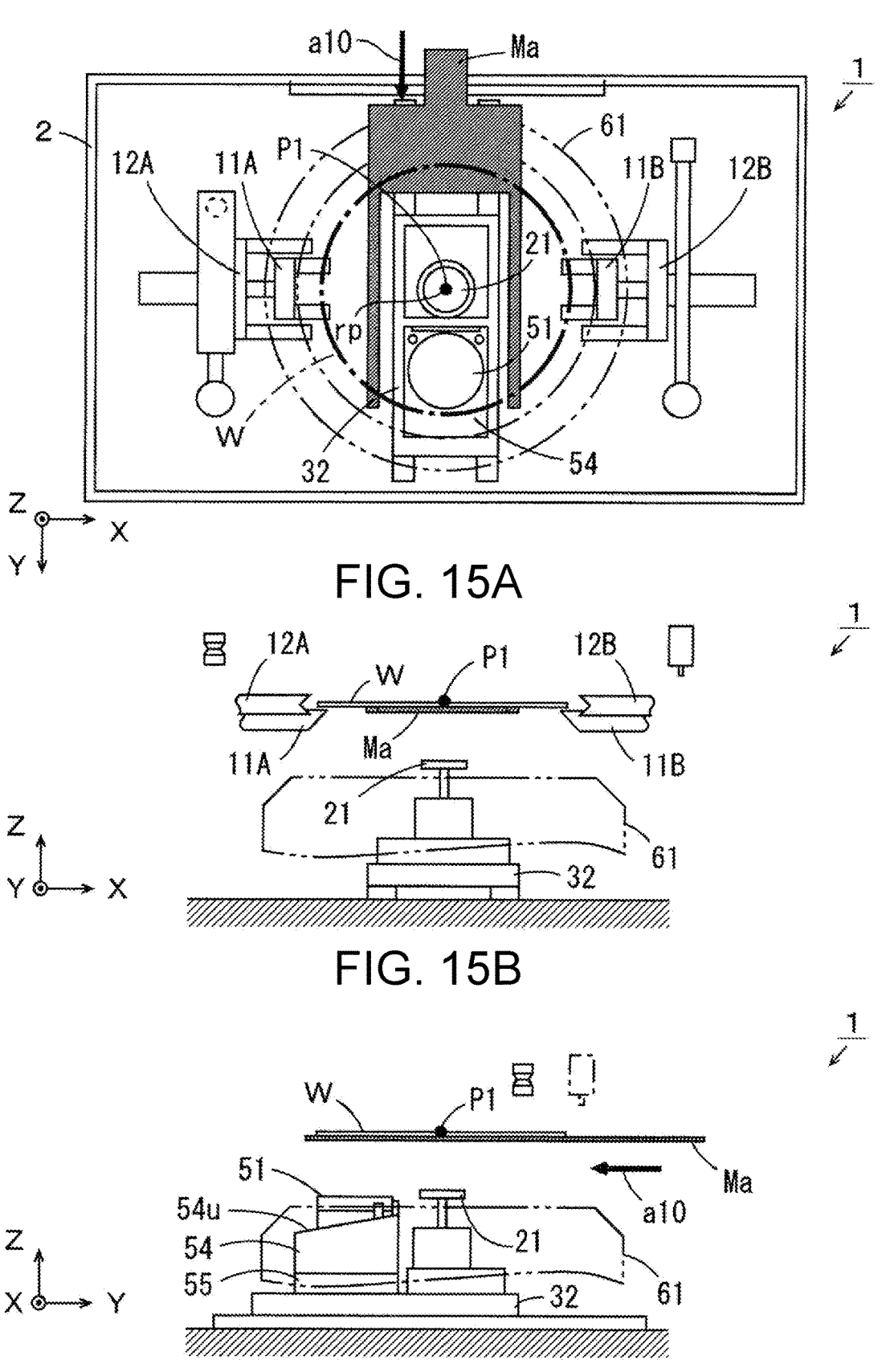

Next, the shutter 91 opens the loading/unloading port 2*x*, and, as indicated by an arrow sign a10 of a thick solid line in FIGS. 15A to 15C, the hand Ma of the main robot 300 enters the unit housing 2 through the loading/unloading port 2*x* and receives the substrate W at the first processing position p1. The substrate W received by the hand Ma is fixed at the hand reference position by using the fixing device 350.

Figures 16A, 16B, 16C:
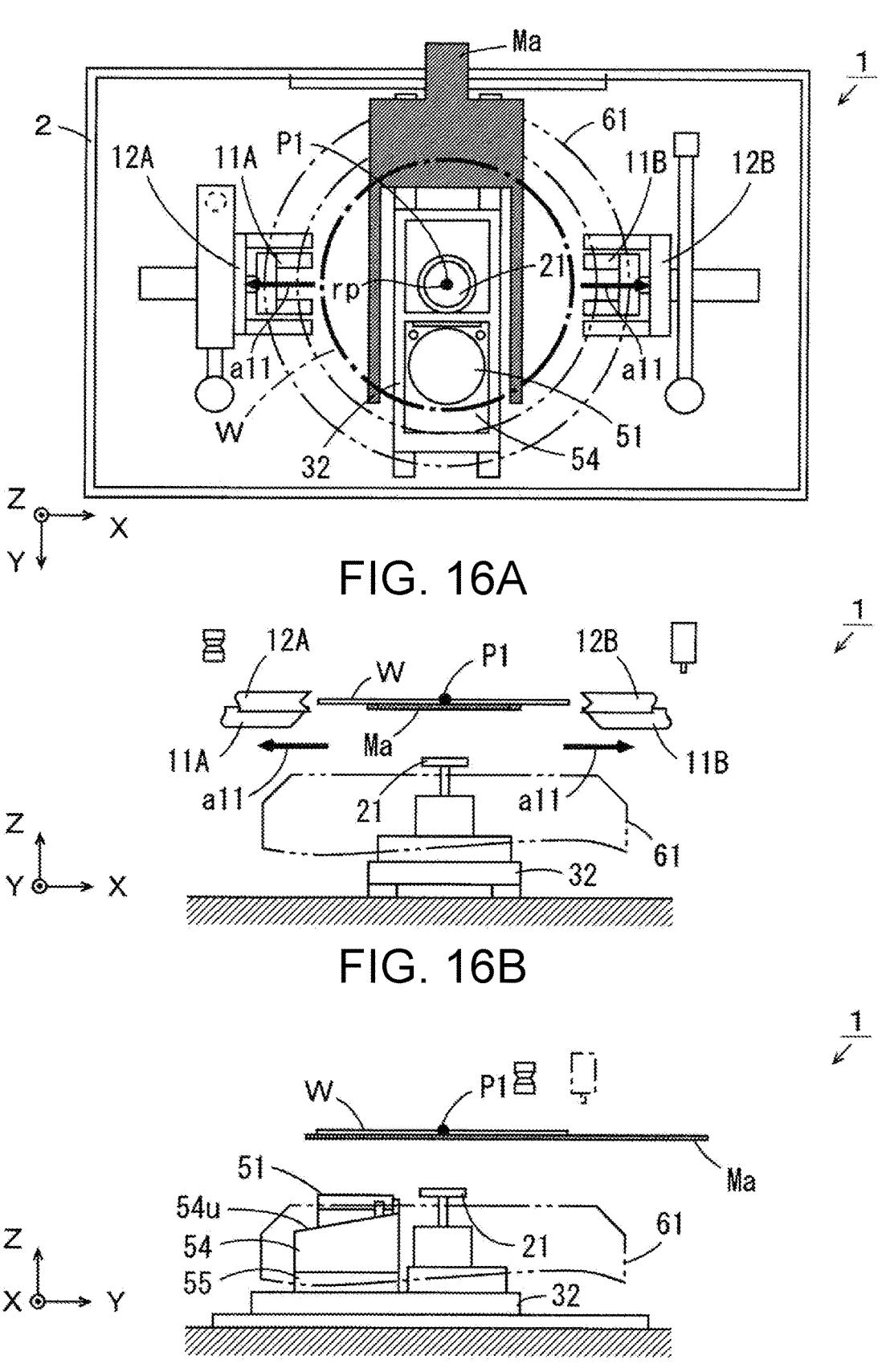
Figures 17A, 17B, 17C:
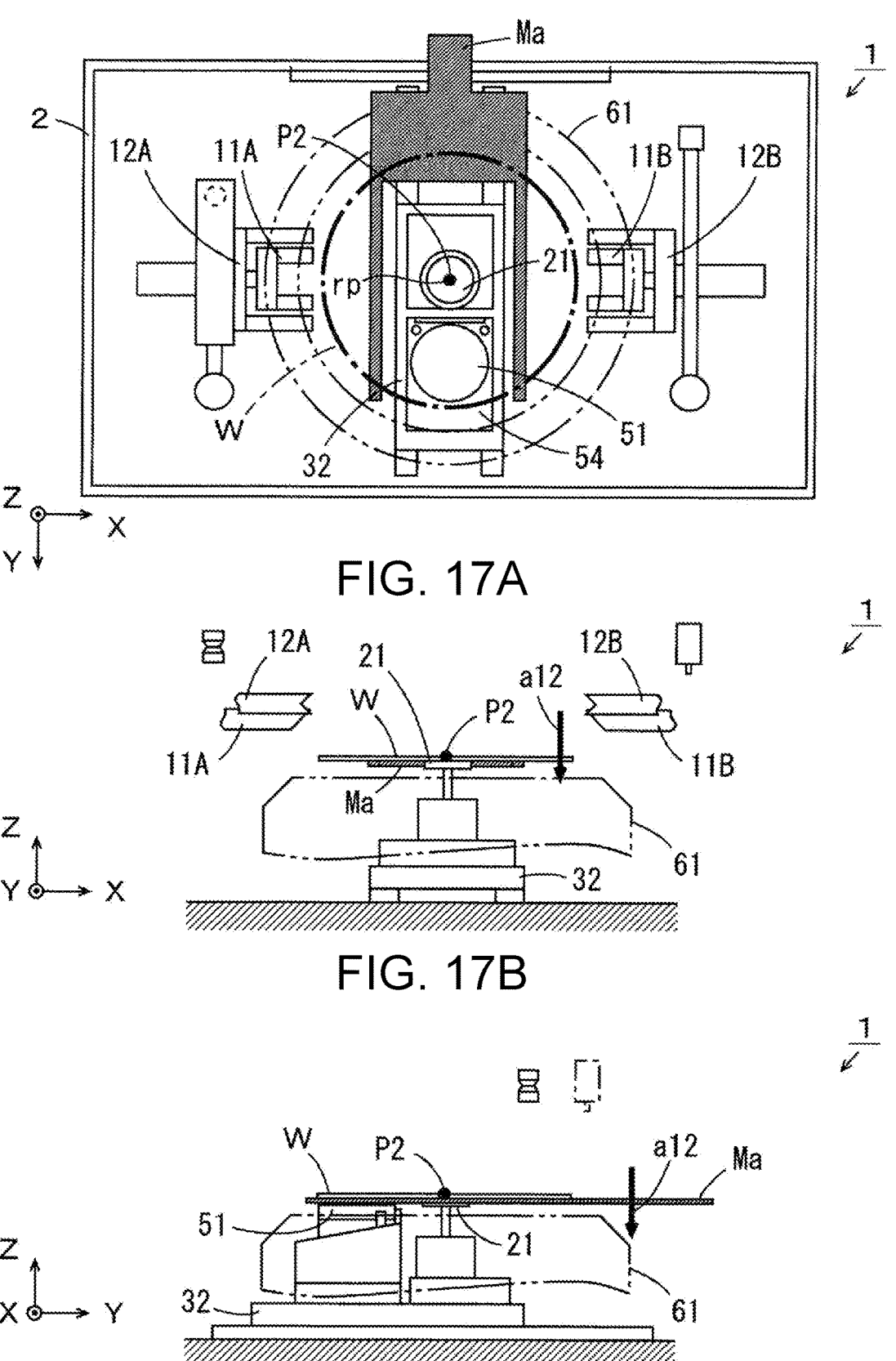
FIGS. 17A to 17C are schematic views illustrating an example of the operation of the substrate cleaning device of FIG. 5 and the main robot of FIG. 1.

Then, as indicated by an arrow sign a11 of a thick solid line in FIGS. 16A and 16B, the lower chucks 11A, 11B move away from each other. At this time, the lower chucks 11A, 11B move to positions not overlapped with the substrate W in plan view. Accordingly, the upper holding devices 10A, 10B return to the initial state together.

Then, the hand Ma of the main robot 300 transports the substrate W from the first processing position P1 to the second processing position P2, and transfers the substrate W to the lower holding device 20. Specifically, as indicated by an arrow sign a12 of a thick solid line of FIGS. 17B and 17C, the hand Ma holding the substrate W is lowered. In addition, at a time point when the substrate W arrives at the second processing position P2 or a time point right before the substrate W arrives at the second processing position P2, the fixing state of the substrate W by the fixing device 350 is removed. In this way, the substrate W held by the hand Ma is positioned at the second processing position P2, and received by the suction holding part 21. In such state, the suction holding part 21 sucks and holds the lower surface central region of the substrate W. At this time, the center of the substrate W sucked and held by the lower holding device 20 is overlapped with the plane reference position rp in plan view. Then, the hand Ma leaves the unit housing 2. After the hand Ma leaves, the shutter 91 blocks the loading/unloading port 2*x*.

Figures 18A, 18B, 18C:
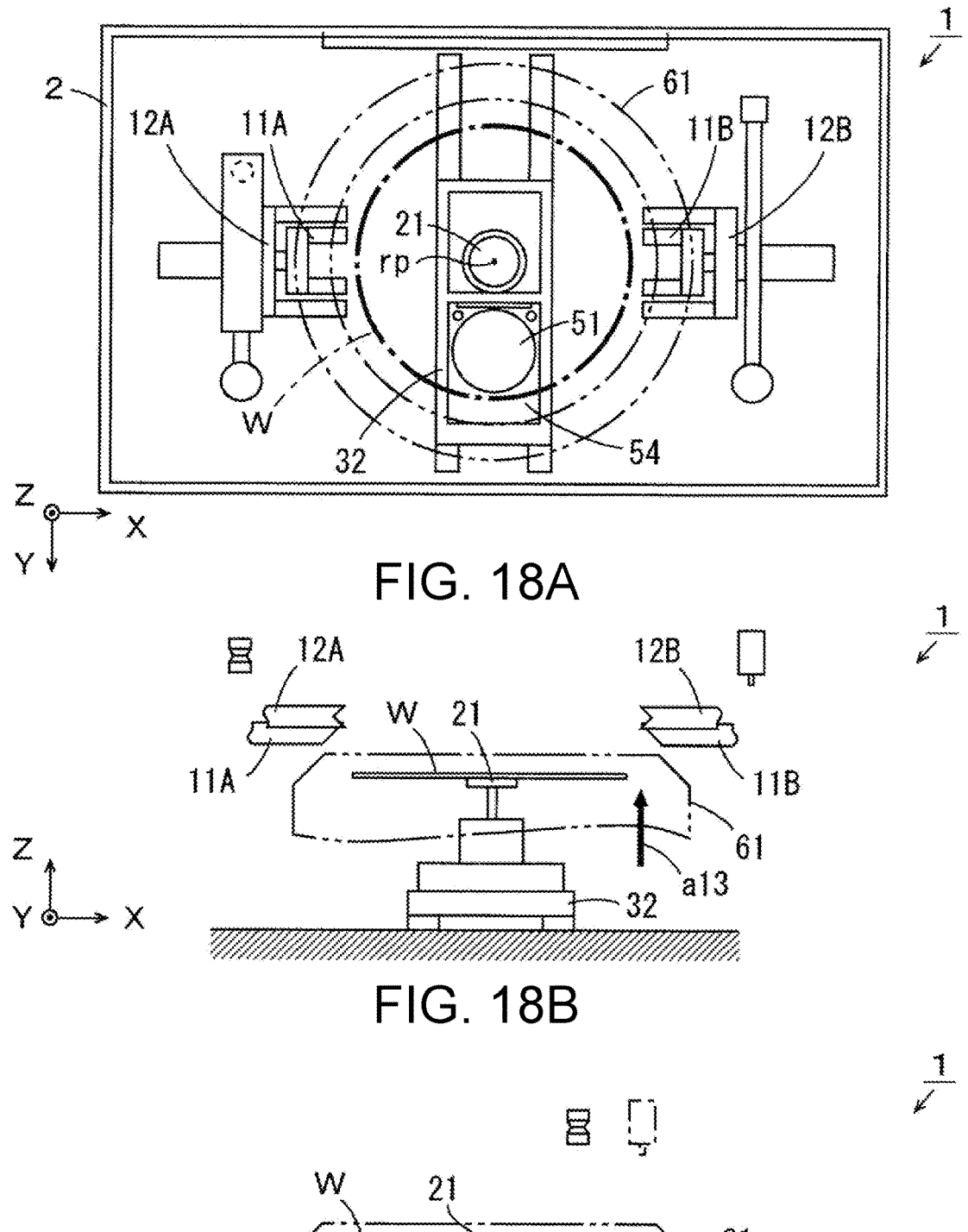
FIGS. 18A to 18C are schematic views illustrating an example of the operation of the substrate cleaning device of FIG. 5 and the main robot of FIG. 1.

Then, as indicated by an arrow sign a13 of a thick solid line in FIGS. 18B and 18C, the processing cup 61 is raised from the lower cup position to the upper cup position. Accordingly, the substrate W at the second processing position P2 is located below the upper end of the processing cup 61.

Figures 19A, 19B, 19C:
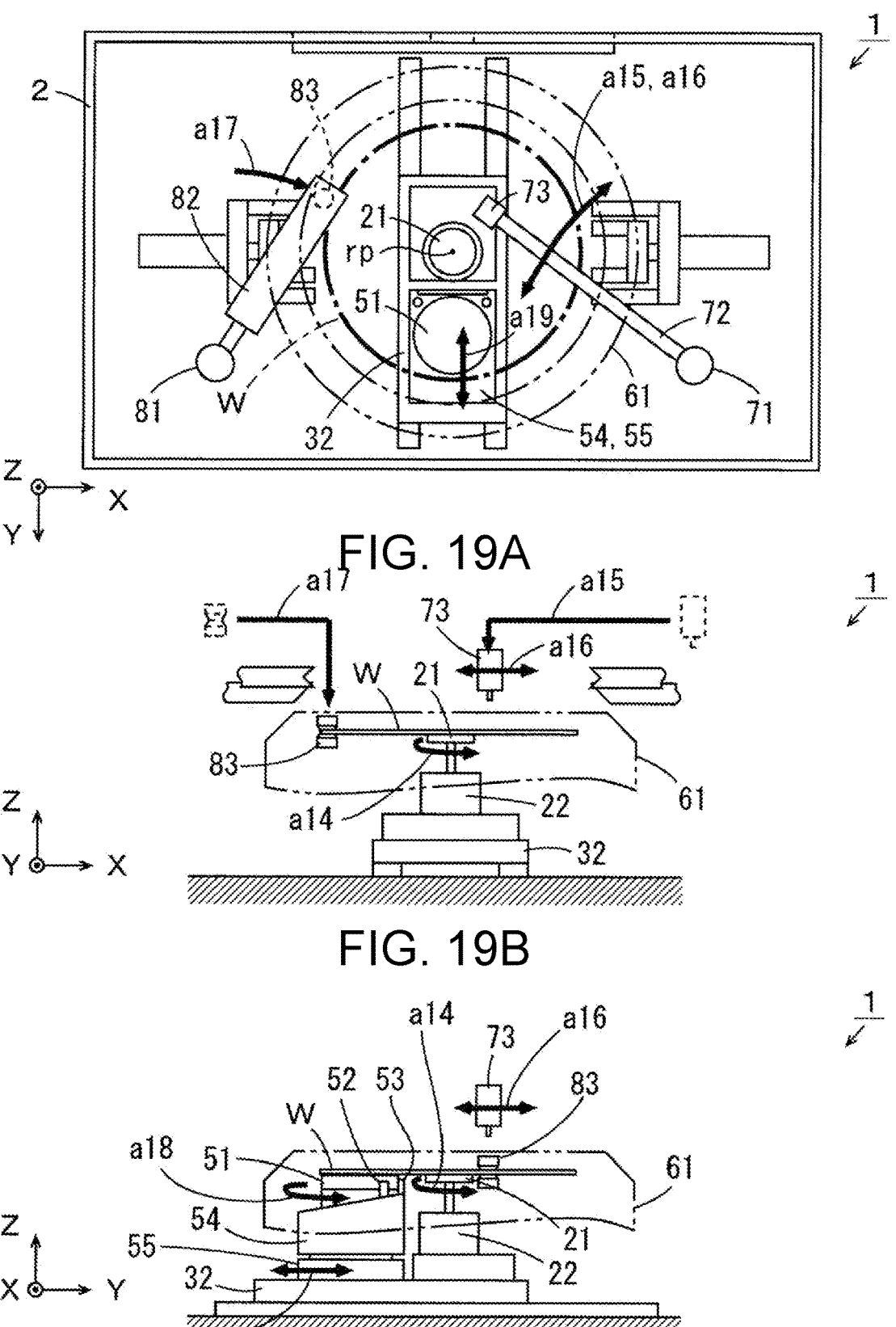
FIGS. 19A to 19C are schematic views illustrating an example of the operation of the substrate cleaning device of FIG. 5 and the main robot of FIG. 1.
Figures 20A, 20B, 20C:
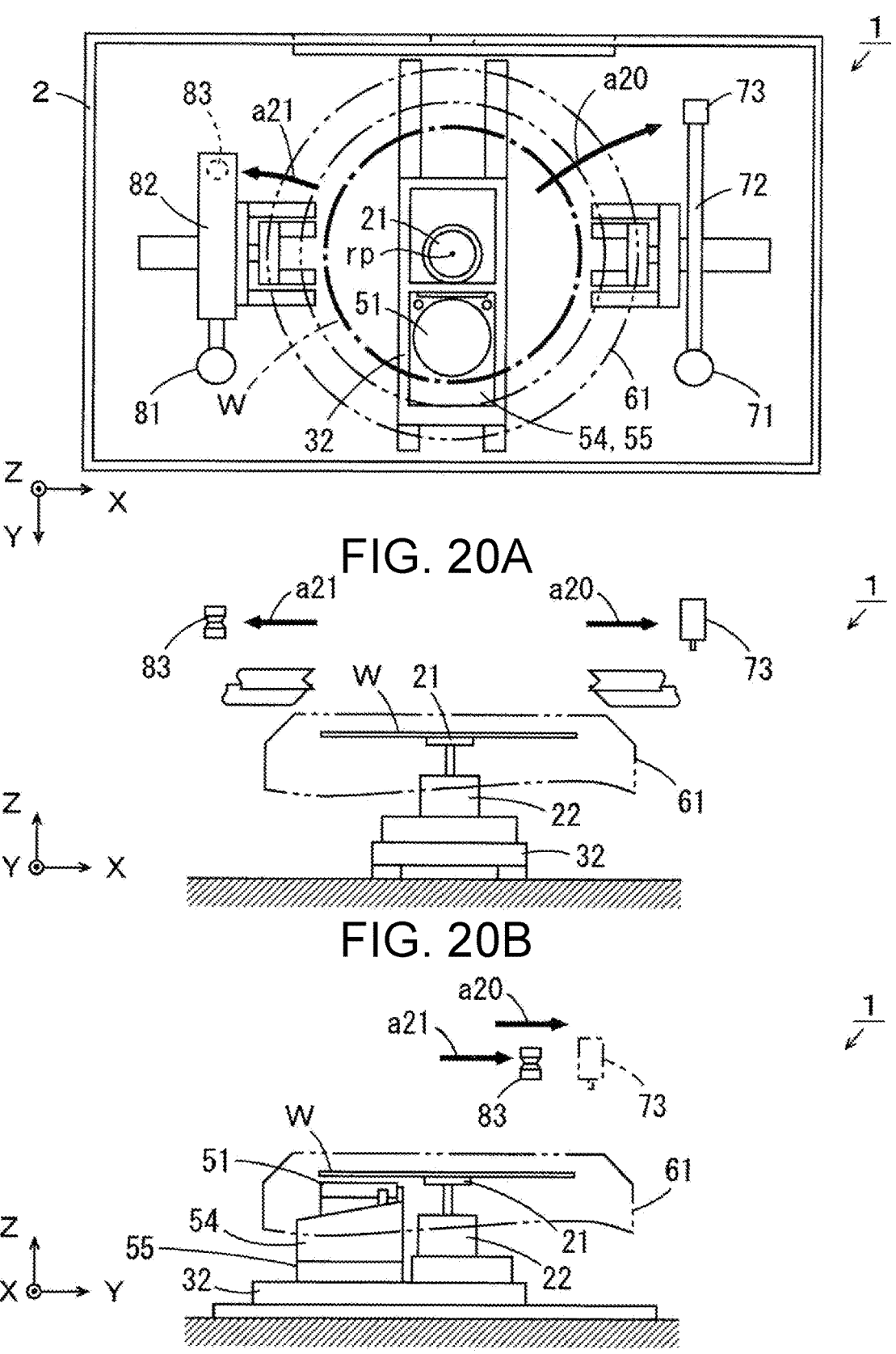
FIGS. 20A to 20C are schematic view illustrating an example of the operation of the substrate cleaning device of FIG. 5 and the main robot of FIG. 1.

Then, as indicated by an arrow sign a14 of a thick solid line in FIGS. 19B and 19C, the suction holding part 21 rotates about an axis in the up-down direction (the axial center of the rotation axis of the suction holding driving part 22). Accordingly, the substrate W sucked and held by the suction holding part 21 rotates in a horizontal posture.

In the following, the rotation support shaft 71 of the upper surface cleaning device 70 rotates and is lowered. Accordingly, as indicated by an arrow sign a15 of a thick solid line in FIGS. 19A and 19B, the spray nozzle 73 moves until a position above the substrate W, and is lowered so that the distance between the spray nozzle 73 and the substrate W becomes a predetermined distance. In such state, the spray nozzle 73 ejects the mixed fluid of the cleaning liquid and the gas to the upper surface of the substrate W. In addition, the rotation support shaft 71 rotates. Accordingly, as indicated by an arrow sign a16 of a thick solid line of FIGS. 19A to 19C, the spray nozzle 73 moves to a position above the rotating substrate W. By ejecting the mixed fluid to the entire upper surface of the substrate W, the entire upper surface of the substrate W is cleaned.

In addition, at the time of cleaning the upper surface of the substrate W by using the spray nozzle 73, the rotation support shaft 81 of the end cleaning device 80 rotates and is lowered as well. Accordingly, as indicated by an arrow sign a17 of a thick solid line in FIGS. 19A to 19C, the bevel brush 83 moves to a position above the outer peripheral end of the substrate W. In addition, the central portion of the outer peripheral surface of the bevel brush 83 is lowered to contact the outer peripheral end of the substrate W. In such state, the bevel brush 83 rotates about an axis in the up-down direction. Accordingly, contaminants adhered to the outer peripheral end of the substrate W are physically removed by the bevel brush 83. The contaminants removed from the outer peripheral end of the substrate W are washed away by the cleaning liquid of the mixed fluid ejected from the spray nozzle 73 to the substrate W.

In addition, at the time of cleaning the upper surface of the substrate W by using the spray nozzle 83, the elevation support part 54 is raised, so that the cleaning surface of the lower surface brush 51 contacts the lower surface outer region of the substrate W. In addition, as indicated by an arrow sign a18 of a thick solid line in FIG. 19C, the lower surface brush 51 rotates about an axis in the up-down direction. In addition, the liquid nozzle 52 discharges the cleaning liquid toward the lower surface of the substrate W, and the gas ejection part 53 ejects the gas toward the lower surface of the substrate W. In such state, as indicated by an arrow sign a19 of a thick solid line in FIGS. 19A and 19C, the movable support part 55 performs an advancing/retracting operation between the close position and the separation position on the movable pedestal 32. In this way, with the lower surface brush 51 being moved in the horizontal direction by using the movement support part 55 in the state of contacting the lower surface of the substrate W, the range that can be cleaned by the lower surface brush 51 in the lower surface of the substrate W is increased. Accordingly, the lower surface outer region of the substrate W sucked and held by the suction holding part 21 and rotated is thoroughly cleaned by the lower surface brush 51.

Then, when the cleaning of the upper surface, the outer peripheral end, and the lower surface outer region of the substrate W is completed, the ejection of the mixed fluid from the spray nozzle 73 to the substrate W is stopped. In addition, as indicated by an arrow sign a20 of a thick solid line in FIGS. 20A to 20C, the spray nozzle 73 moves to a position (position of the initial state) of a side of the processing cup 61. In addition, as indicated by an arrow sign a21 of a thick solid line in FIGS. 20A to 20C, the bevel brush 83 moves to a position (position of the initial state) of the other side of the processing cup 61. Moreover, the rotation of the lower surface brush 51 is stopped, and the elevation support part 54 is lowered, so that the cleaning surface of the lower surface brush 51 is separated from the substrate W by a predetermined distance. In addition, the discharge of the cleaning liquid from the liquid nozzle 52 toward the substrate W and the ejection of the gas from the gas ejection part 53 toward the substrate W are stopped. In such state, with the suction holding part 21 rotating at a high speed, the cleaning liquid adhered to the substrate W is shaken off, and the entire substrate W is dried.

Figures 21A, 21B, 21C:
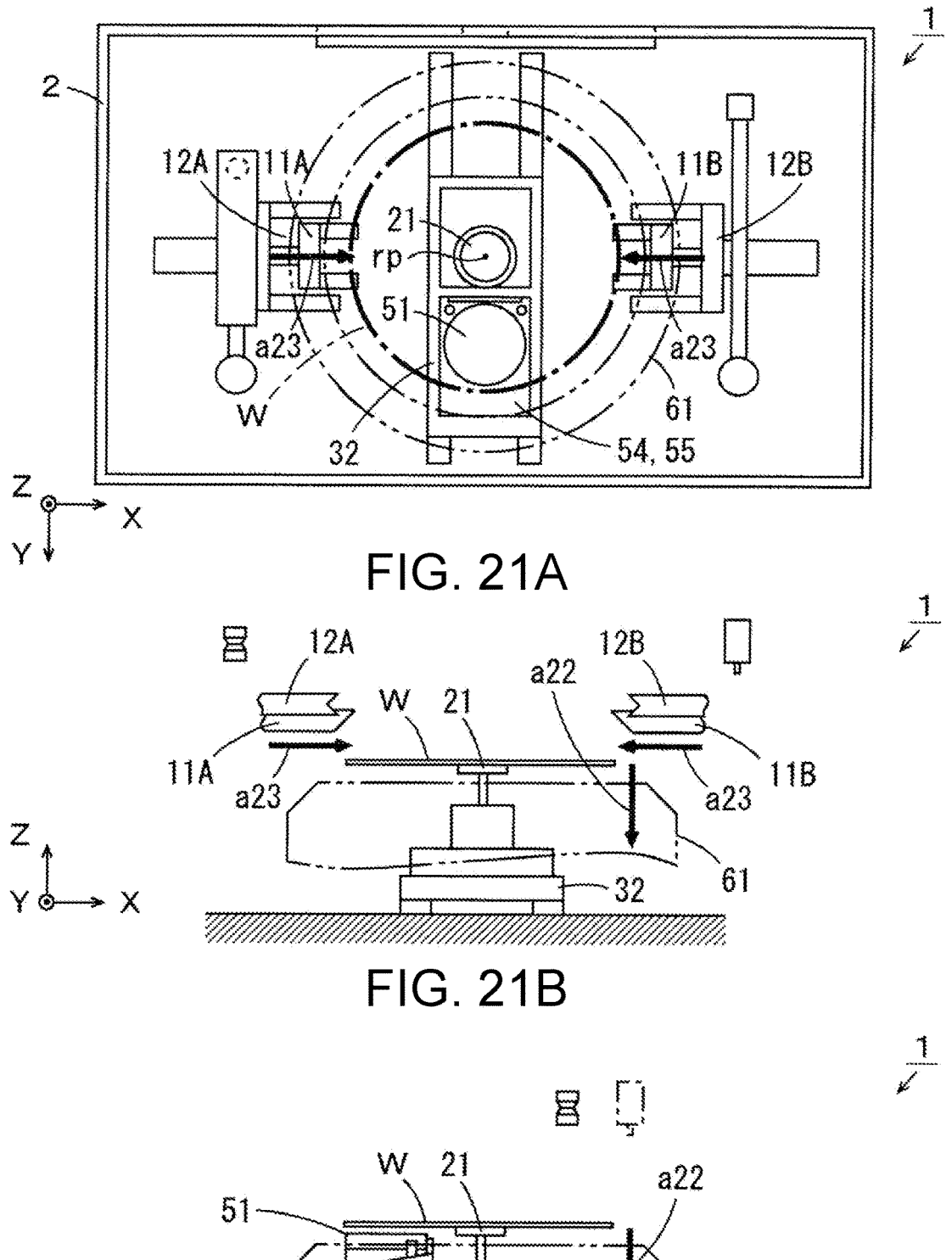
FIGS. 21A to 21C are schematic views illustrating an example of the operation of the substrate cleaning device of FIG. 5 and the main robot of FIG. 1.
Figures 22A, 22B, 22C:
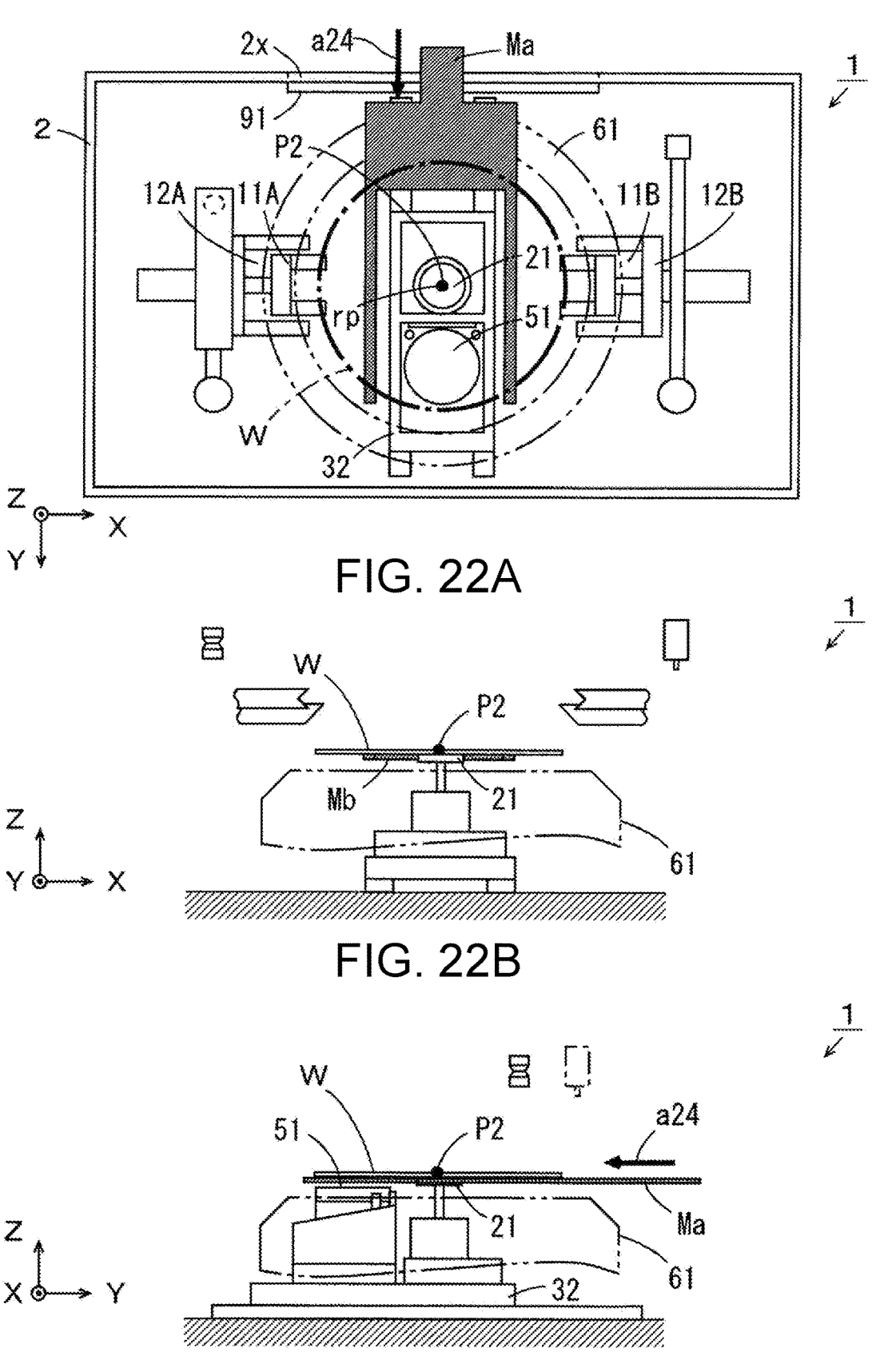
FIGS. 22A to 22C are schematic views illustrating an example of the operation of the substrate cleaning device of FIG. 5 and the main robot of FIG. 1.

Then, as indicated by an arrow sign a22 of a thick solid line in FIGS. 21B and 21C, the processing cup 61 is lowered from the upper cup position to the lower cup position. Moreover, in preparation of a new substrate W to be loaded in the unit housing 2, as indicated by an arrow sign a23 of a thick solid line in FIGS. 21A and 21C, the lower chucks 11A, 11B approach each other until a position able to support a new substrate W.

Lastly, the substrate W is unloaded from the unit housing 2 of the substrate cleaning device 1. Specifically, the shutter 91 opens the loading/unloading port 2x immediately before the substrate W is unloaded. Then, as indicated by an arrow sign a24 of a thick solid line in FIGS. 22A to 22C, the hand Ma receives the processed substrate W disposed at the second processing position P2 and leaves the unit housing 2. After the hand Ma leaves, the shutter 91 blocks the loading/unloading port 2x.

<6> Substrate Processing

Figure 23:
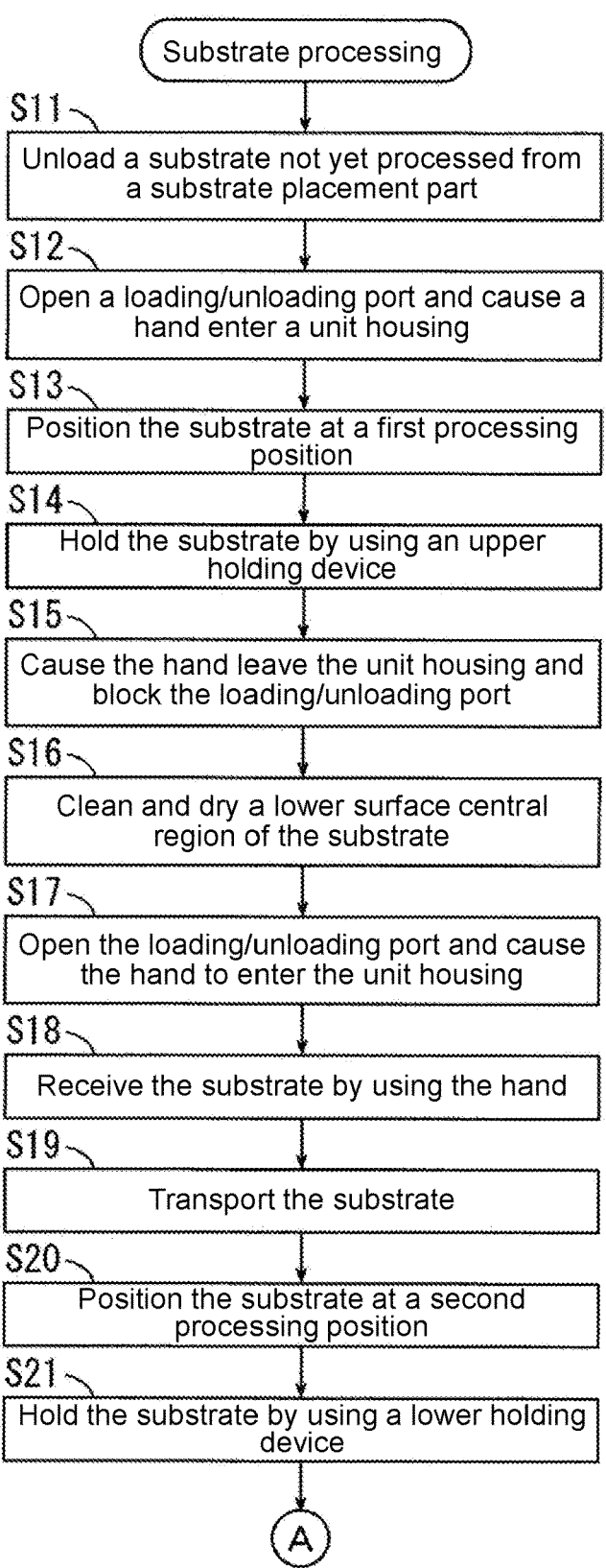
FIG. 23 is a flowchart illustrating a substrate process for a substrate according to a control device of FIG. 7.
Figure 24:
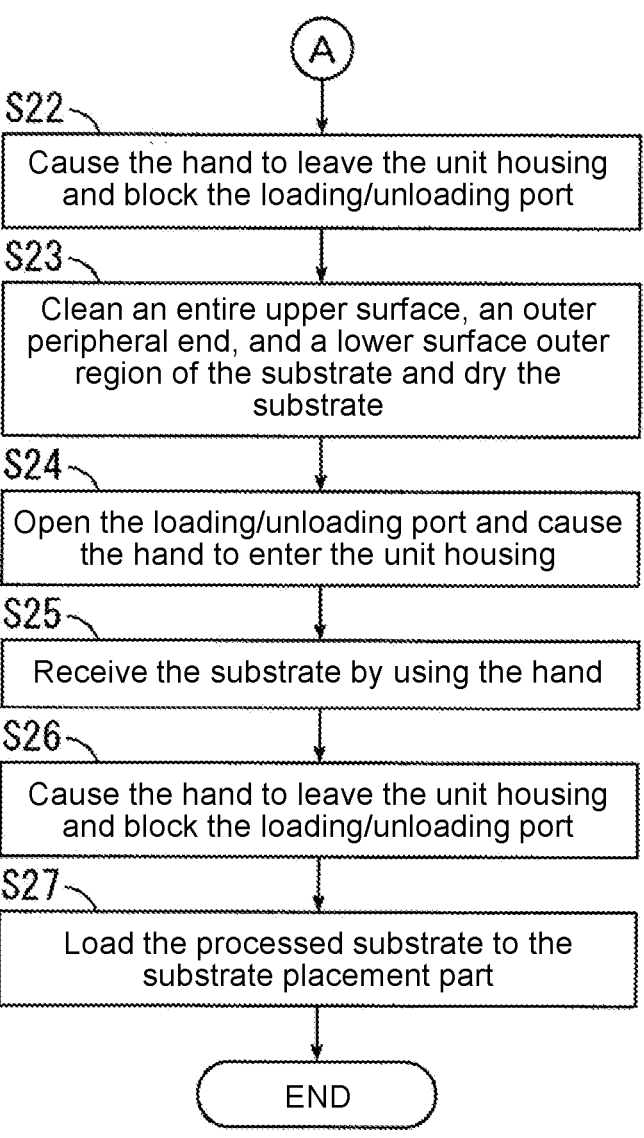
FIG. 24 is a flowchart illustrating a substrate process for a substrate according to a control device of FIG. 7.

FIGS. 23 and 24 are flowcharts illustrating a substrate process for one substrate W in the control device 170 of FIG. 7. The substrate processing of FIGS. 23 and 24 is carried out by executing, in the RAM, the substrate processing program stored in the storage device by using the CPU of the control device 170. In the following, the substrate processing is described with reference of the flowcharts of FIGS. 23 and 24.

Although the flowcharts in FIGS. 23 and 24 mainly describe the operation of the hand Ma of the main robot 300, the operations of the hands Mb to Md are the same as the operation of the hand Ma. In addition, in the flowcharts of FIGS. 23 and 24, the description about the operation of the indexer robot 200 is omitted.

Firstly, the main robot 300 unloads one substrate W not yet processed from the substrate placement part PASS2 by using the hand Ma (Step S11). Then, in one substrate cleaning device 1 for cleaning the substrate W, the loading/unloading port 2x is opened. Therefore, the main robot 300 causes the hand Ma to enter the unit housing 2 of the substrate cleaning device 1 through the loading/unloading port 2x that is opened (Step S12).

Then, the main robot 300 positions the substrate W at the first processing position P1 based on the position information determined as the transfer position of the substrate W with respect to the substrate cleaning device 1 (Step S13). In Steps S11 to S13, during the transportation of the substrate W by using the hand Ma, the substrate W is fixed to the hand reference position of the hand Ma by using the fixing device 350.

Then, by using the upper holding devices 10A, 10B of the substrate cleaning device 1, the substrate W positioned at the first processing position P1 is received and held (Step S14). Then, the main robot 300 causes the hand Ma to leave the unit housing 2 of the substrate cleaning device 1. In addition, in the substrate cleaning device 1, the loading/unloading port 2x is blocked after the hand Ma leaves (Step S15).

Then, the substrate cleaning device 1 performs cleaning and drying of the lower surface central region of the substrate W in accordance with the example of the operations of FIGS. 12A to 14C. When the drying of the substrate W in Step S16 is completed, the loading/unloading port 2x in the substrate cleaning device 1 is opened. Therefore, the main robot 300 causes the hand Ma to enter the unit housing 2 of the substrate cleaning device 1 through the loading/unloading port 2x that is opened (Step S17).

Then, the main robot 300 receives the substrate W from the upper holding devices 10A, 10B by using the hand Ma based on the position information of the predetermined reception position (first processing position P1 in this step) (Step S18). In addition, the main robot 300 transports the received substrate W to the transfer position (second processing position P2 in this step) with respect to the lower holding device 20 in the unit housing 2 of the substrate cleaning device 1 (Step S19). In addition, the main robot 300 positions the substrate W at the second processing position P2 (Step 20). In Steps S18 to S20, during the transportation of the substrate W by using the hand Ma, the substrate W is fixed to the hand reference position of the hand Ma by using the fixing device 350.

Then, by using the lower holding device 20 of the substrate cleaning device 1, the substrate W positioned at the second processing position 2 is received, and the lower surface central region of the substrate W is sucked and held (Step S21). Then, the main robot 300 causes the hand Ma to leave the unit housing 2 of the substrate cleaning device 1. In addition, in the substrate cleaning device 1, the loading/unloading port 2x is blocked after the hand Ma leaves (Step S22).

Then, the substrate cleaning device 1 cleans the entire upper surface, the outer peripheral end, and the lower surface outer region of the substrate W and dries the substrate W in accordance with the example of the operations of FIGS. 18A to 20C (Step S23). When the drying of the substrate W in Step S23 is completed, the loading/unloading port 2x in the substrate cleaning device 1 is opened. Therefore, the main robot 300 causes the hand Ma to enter the unit housing 2 of the substrate cleaning device 1 through the loading/unloading port 2x that is opened (Step S24).

Then, the main robot 300 receives the substrate W from the lower holding device 20 by using the hand Ma based on the position information of the predetermined reception position (second processing position P2 in this step) (Step S25). Then, the main robot 300 causes the hand Ma to leave the unit housing 2 of the substrate cleaning device 1. In addition, in the substrate cleaning device 1, the loading/unloading port 2x is blocked after the hand Ma leaves (Step S26).

Lastly, the main robot 300 loads the processed substrate W to the substrate placement part PASS1 by using the hand Ma (Step S27). Accordingly, a series of substrate processing for one substrate W is completed.

<7> Effects (a) In the substrate cleaning device 1 according to the embodiment, the transportation and positioning of the substrate W are performed by using the main robot 300 based on the position information of multiple reception positions and multiple transfer positions stored in advance in the position information storage part 182 of FIG. 7.

Specifically, the main robot 300 positions the substrate W not yet processed at the first processing position P1 at the time of transporting the substrate W into the substrate cleaning device 1. In addition, the main robot 300 moves the substrate W in which the lower surface central region of the substrate W is cleaned from the first processing position P1 to the second processing position P2 in the unit housing 2 of the substrate cleaning device 1. At this time, the substrate W can be positioned at the second processing position P2 with the same accuracy as the accuracy of positioning the substrate W at the first processing position P1. Accordingly, after the substrate W is transported from the first processing position P1 to the second processing position P2, the substrate W is prevented from being displaced significantly from the second processing position P2.

As a result, it is possible to suppress a processing defect of the substrate W due to a positional displacement from occurring, without providing an expensive transportation mechanism with high positioning capability in the substrate cleaning device 1.

(b) The fixing device 350 is provided in each hand (Ma to Md) of the main robot 300. Accordingly, even in the case where the position relationship between the hand and the substrate W at the time of receiving the substrate W by using the hand is not the predetermined relationship, at the time of transporting the substrate W, the substrate W is fixed to the hand reference position on the hand by using the fixing device 350. Therefore, the position relationship between the hand and the substrate W is not displaced during the movement of the hand. Therefore, at the time of transporting the substrate W from the first processing position P1 to the second processing position P2, by moving the hand in accordance with the position information, the substrate W held by the hand can be accurately positioned to the second processing position P2.

(c) In the substrate cleaning device 1, the first processing position P1 and the second processing position P2 are arranged in the up-down direction in the unit housing 2. Each of the hands Ma to Md is configured to hold the substrate W in a horizontal posture. In such case, compared with the case where the hand holds the substrate W in a vertical posture, the distance between the first processing position P1 and the second processing position P2 can be shorter. Accordingly, the transportation time of the substrate W between the first processing position P1 and the second processing position P2 can be reduced.

(d) In the substrate cleaning device 1, the substrate W not yet processed is transported and positioned to the first processing position P1 by using the main robot 300, and is held by the upper holding device 10A, 10B. Accordingly, in the first processing position P1, the lower surface central region of the substrate W that is supposed to be cleaned is more accurately cleaned by the lower surface cleaning device 50.

In addition, the substrate W after cleaning of the lower surface region is transported and positioned to the second processing P2 by using the main robot 300. In addition, the substrate W positioned at the second processing position P2 is sucked and held by the lower holding device 2 and rotated. In such state, the lower surface outer region of the substrate W is more accurately cleaned by the lower cleaning 50. As a result, a cleaning defect of the lower surface of the substrate W due to displacement of the position of the substrate W is prevented.

2. Second Embodiment

Regarding the substrate processing device for the second embodiment, the points differing from the substrate processing device 100 of the first embodiment will be described. In the substrate processing device according to the embodiment, the fixing device 350 is not provided in each of the hands Ma to Md of the main robot 300. The hands Ma to Md of the embodiment are suction-type hands able to hold the substrates W by sucking multiple portions (e.g., three portions) of the lower surface of the substrate W.

Therefore, when each hand receives the substrate W displaced from the hand reference position, the substrate W cannot be accurately positioned to the transfer position even if the hand is transported solely based on the transfer position. Therefore, in the substrate processing device of the embodiment, inside the unit housing 2 of each substrate cleaning device 1, a hand position detection device is provided. The hand position detection device inspects a relative position (referred to as hand relative position in the following) of the substrate W held by the hand with respect to the hand reference position. Alternatively, a hand position detection device detecting the hand relative position is provided in each of the hands Ma to Md.

The hand position detection device, for example, may include an image capturing part capturing an image of the substrate W held by the hand as well as the hand. In such case, the hand relative position can be detected based on the image data obtained through image capturing. Alternatively, the hand position detection device may also include multiple line sensors installed to the hand. In such case, the line sensors, for example, are provided so as to be overlapped with three or more portions differing from each other in the outer peripheral end of the substrate W held by the hand in plan view. In addition, each line sensor is provided to be able to detect the relative position with the hand for a portion of the outer peripheral end of the substrate W overlapped with the line sensor in plan view. Accordingly, based on the relative positions of the portions of the substrate W detected by the line sensors, the hand relative position can be detected.

Figure 25:
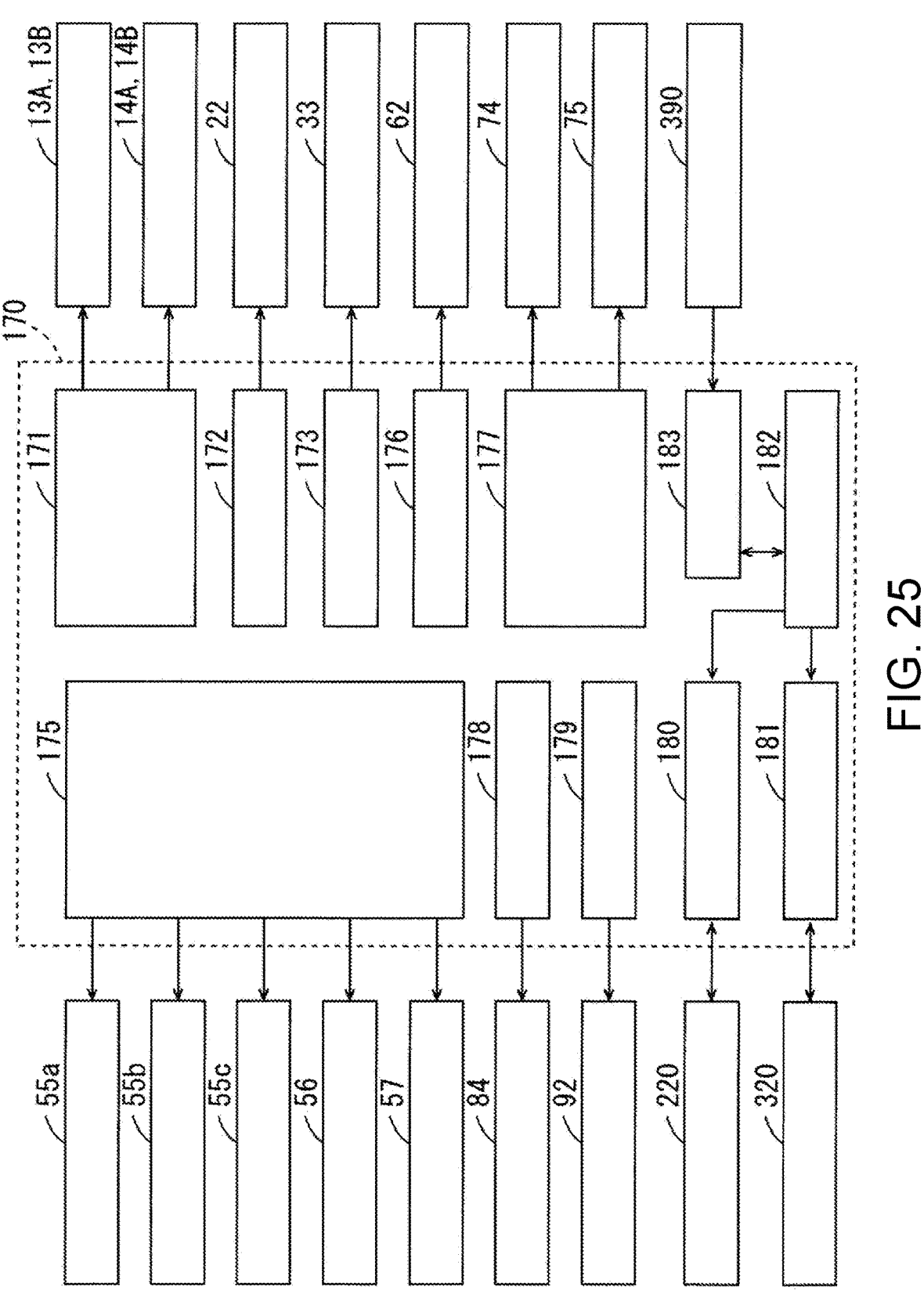
FIG. 25 is a block diagram illustrating a configuration of a control system of a substrate processing device according to a second embodiment.

FIG. 25 is a block diagram illustrating a configuration of a control system of a substrate processing device according to a second embodiment. As shown in FIG. 25, in the control system of the substrate processing device according to FIG. 25, the control device 170 further includes a correction part 183 in addition to the various functional parts (171 to 173, 175 to 182) of FIG. 7.

In the main robot 300, at the time when the substrate W is held by each of the hands Ma to Md, the hand position detection device 390 detects the hand relative position in the state in which the substrate W is held by the hand. In such case, the correction part 183 calculates the displacement amount of the substrate W with respect to the hand reference position based on the detected hand relative position.

According to the calculated displacement amount, the displacement amount of the substrate W with respect to the transfer position when it is assumed that the hand has moved based on the position information of the transfer position stored in the position information storage part 182 can be obtained. Therefore, the correction part 183 calculates the displacement amount of the substrate W with respect to the hand reference position based on the hand relative position detected by the hand position detection device 390 after the substrate W is received at the reception position. In addition, the correction part 183 corrects the position information of the transfer position stored in the position information storage part 182 in advance, so as to offset the displacement amount generated at the time when the substrate W is transported to the transfer position based on the position information of the transfer position and the calculated displacement amount. Accordingly, the transportation control part 181 controls the transportation driving part 320, so that the substrate W is positioned at the transfer position based on the corrected position information.

According to the above, in the substrate processing device 100 according to the embodiment, at the time of transporting the substrate W by using each of the hands Ma to Md, the substrate W is not fixed to the hand reference position in the hand, but the hand relative position is detected. In addition, based on the detected hand relative position, various position information stored in the position information storage part 182 is corrected. Accordingly, the substrate W is accurately moved from the first processing position P1 to the second processing position P2 by using the main robot 300, and is positioned at the second processing position P2.

3. Other Embodiments (a) In the above embodiments, the first processing position P1 and the second processing position P2 are arranged in the up-down direction in the substrate cleaning device 1 in the above embodiments. However, the disclosure is not limited to such limitations. The first processing position P1 and the second processing position P2 may also be arranged horizontally.

(b) In the above embodiments, with respect to the substrate W loaded in the substrate cleaning device 1, the cleaning of the lower surface central region of the substrate W at the first processing position P1 and the cleaning of the lower surface outer region of the substrate W at the second processing position P2 are carried out in such order. However, the disclosure is not limited to the above embodiments.

In the substrate cleaning device 1, it may also be that the cleaning of the lower surface central region of the substrate W at the first processing position P1 is performed after the cleaning of the lower surface outer region of the substrate W loaded to the substrate cleaning device 1 at the second processing position P2 is performed. In such case, after the cleaning of the lower surface outer region of the substrate W, the main robot 300 transports the substrate W from the second processing position P2 to the first processing position P1 by causing the hand to enter the loading/unloading port 2x. In this case as well, inside the unit housing 2, the transportation of the substrate W is accurately transported by using the main robot 300.

(c) In the above embodiments, the main robot 300 has four hands Ma to Md. However, the disclosure is not limited thereto. The main robot 300 may also have one hand only, and may also have multiple hands, such as two, three, or five or more hands.

(d) In the above embodiments, the substrate cleaning device 1 performing the cleaning process as the processing unit is provided. However, the disclosure is not limited thereto. As the processing unit, a thermal processing device for thermal processing, an imaging device for performing an imaging process, or a coating device for performing a coating process may also be provided.

In the case where the thermal processing device is provided as the processing unit, the thermal processing device may be configured to be able to execute a heating process and a cooling process as a first process and a second process of the embodiment. In the case where the imaging device is provided as the processing unit, the imaging device may also be configured to be able to execute a process for supplying an imaging liquid to the substrate W and a process for supplying a rinsing liquid to the substrate W as the first process and the second process of the disclosure. In the case where the coating device is provided as the processing unit, the coating device may be configured to be able to execute a process of supplying a first coating liquid to the substrate W and a process of supplying a second coating liquid to the substrate W as the first processing and the second processing. In such case, the first coating liquid and the second coating liquid may be the same coating liquid and may also be coating liquids different from each other.

(e) In the above embodiments, the substrate processing device 100 includes the control device 170 controlling the substrate cleaning device 1 and the main robot 300, but the embodiment is not limited thereto. In the case where the substrate cleaning device 1 and the main robot 300 are configured to be controllable by using an external information processing device of the substrate processing device 100, the substrate processing device 100 may also omit the control device 170.

(F) In the substrate cleaning device 1 according to the embodiments, the lower surface central region and the lower surface outer region of the substrate W are cleaned by the lower surface cleaning device 50. However, the disclosure is not limited thereto. The configuration for cleaning the lower surface central region of the substrate W and the configuration for cleaning the lower surface outer region of the substrate W may also be provided separately.

4. Corresponding Relations Between Respective Components of Claims and Respective Parts of the Embodiments In the following, examples of the correspondence between the respective components of the claims and the respective elements of the embodiments will be described below, but the disclosure is not limited to the following examples. Various other elements having the configurations or functions set forth in the claims can be used as the respective components of the claims.

In the above embodiments, the substrate cleaning device 1 is an example of the processing unit, the hands Ma to Md of the main robot 300 are an example of the holding part, the main robot 300 is an example of the transportation device, the loading/unloading port 2x of the unit housing 2 is an example of the opening part, the unit housing 2 is an example of the chamber, the first processing position P1 is an example of the first processing position, the second processing position P2 is an example of the second processing position, and the internal space of the unit housing 2 is an example of the processing space.

In addition, the cleaning process of the lower surface central region of the substrate W by using the lower surface cleaning device 50 is an example of the first process, the upper holding devices 10A, 10B and the lower surface cleaning device 50 are an example of the first processing part, the cleaning process of the lower surface outer region of the substrate W by using the lower surface cleaning device 50 is an example of the second process, and the lower holding device 20 and the lower surface cleaning device 50 are an example of the second processing part.

In addition, the substrate processing device 100 is an example of the substrate processing device, the fixing device 350 is an example of the fixing device, the upper holding devices 10A, 10B are an example of the first holding device, the lower surface cleaning device 50 is an example of the first cleaning device and the second cleaning device, the lower holding device 20 is an example of the second holding device, and the hand position detection device 390 is an example of the position detection device.

5. Outline of Embodiments (First aspect) A substrate processing device according to a first aspect includes:

a processing unit; and a transportation device, having a holding part holding a substrate and configured to be able to load and unload the substrate with respect to the processing unit by moving the holding part. The processing unit includes: a chamber, having an opening part and forming a processing space comprising a first processing position and a second processing position; a first processing part, performing a first process on a substrate not yet processed that is accommodated in the chamber and disposed at the first processing position; and a second processing part, performing a second process on the substrate after the first process that is accommodated in the chamber and disposed at the second processing position.

The transportation device receives the substrate disposed at the first processing position by causing the holding part to enter the processing space through the opening part, and transports the received substrate in the processing space to position the received substrate at the second processing position.

The transportation device loading and unloading the substrate with respect to the processing unit can transport and position the substrate based on a unique device coordinate system in the substrate processing device and position information indicating the position to which the substrate is to be transferred.

According to the substrate processing device, the transportation device can position the substrate not yet processed at the first processing position at the time of loading the substrate to the processing unit. In addition, in the case of moving the substrate after the first process from the first processing position to the second processing position, the transportation device can position the substrate at the second processing position with the same accuracy as the accuracy of positioning the substrate in the first processing position. Accordingly, after the substrate is transported from the first processing position to the second processing position, the substrate is prevented from being displaced significantly from the second processing position.

As a result, it is possible to suppress a processing defect of the substrate from occurring due to a position displacement, without providing an expensive transportation mechanism with high positioning capability in the processing unit.

(Second aspect) In the substrate processing device according to the first aspect, it may also be that the transportation device includes a fixing device fixing the substrate to a predetermined position in the holding part in a case where the substrate is held by the holding part, and the transportation device positions the substrate with respect to the second processing position by moving the holding part based on position information indicating the second processing position.

In such case, even if the position relationship between the holding part and the substrate at the time of receiving the substrate by using the holding part is not in the predetermined relationship, the position relationship between the holding part and the substrate is fixed by the fixing device to exhibit the predetermined position relationship. In addition, according to the substrate processing device, displacement does not occur in the position relationship between the holding part and the substrate during movement of the holding part. Therefore, at the time of transporting the substrate from the first processing position to the second processing position, by moving the holding part in accordance with the position information, the substrate held by the holding part can be accurately positioned at the second processing position.

(Third aspect) In the substrate processing device according to the first or second aspect, it may also be that the holding part is configured to hold the substrate in a horizontal posture, and the first processing position and the second processing position are arranged in an up-down direction.

In such case, since the first processing position and the second processing position are arranged in the up-down direction, compared with the case where the holding part holds the substrate in a vertical posture, the distance between the first processing position and the second processing position can be shorter. Accordingly, the transportation time of the substrate between the first processing position and the second processing position can be reduced.

(Fourth aspect) In the substrate processing device according to any one of the first to third aspects, it may also be that one of the first processing part and the second processing part includes: a first holding device, holding an outer peripheral end of the substrate at the first processing position; and a first cleaning device, cleaning a lower surface central region of the substrate held by the first holding device, and an other of the first processing part and the second processing part includes: a second holding device, sucking and holding the lower surface central region of the substrate at the second processing position, while rotating the substrate that is held; and a second cleaning device, cleaning a lower surface outer region of the substrate held and rotated by the second holding device.

In such case, since the substrate is accurately positioned at the first processing position, the region of the lower surface of the substrate that is supposed to be cleaned is correctly cleaned by the first cleaning device. In addition, since the substrate is accurately positioned at the second processing position, the region of the lower surface of the substrate that is supposed to be cleaned is correctly cleaned by the second cleaning device. As a result, a cleaning defect of the lower surface of the substrate due to displacement of the position of the substrate is prevented.

(Fifth aspect) In the substrate processing device according to the first aspect, it may also be that the transportation device includes a position detection device detecting a relative position of the substrate with respect to the holding part in a case where the substrate is held by the holding part, and the transportation device positions the substrate with respect to the second processing position by moving the holding part based on position information indicating the second processing position and the relative position of the substrate detected by the position detection device.

If the relative position of the substrate with respect to the holding part can be grasped, at the time of transporting the substrate from the first processing position to the second processing position, a displacement amount of the substrate with respect to the second processing position when it is assumed that the holding part has moved according to the position information can be obtained. Therefore, according to the substrate processing device, based on the relative position of the substrate detected by the position detection device, the position information can be corrected to offset the displacement amount that occurs at the time of transportation to the second processing position. As a result, by moving the holding part based on the corrected position information, the substrate held by the holding part can be accurately positioned at the second processing position.

(Sixth aspect) A substrate processing method according to a sixth aspect includes: a step of processing a substrate by using a processing unit; and a step of transporting the substrate by using a transportation device. The processing unit includes: a chamber, having an opening part and forming a processing space comprising a first processing position and a second processing position; a first processing part, performing a first process on a substrate not yet processed that is accommodated in the chamber and disposed at the first processing position; and a second processing part, performing a second process on the substrate after the first process that is accommodated in the chamber and disposed at the second processing position. The transportation device has a holding part holding the substrate and configured to be able to load and unload the substrate with respect to the processing unit by moving the holding part. The step of processing the substrate includes: performing the first process on the substrate not yet processed by using the first processing part; and performing the second process on the substrate after the first process by using the second processing part. The step of transporting the substrate includes: receiving the substrate disposed at the first processing position by causing the holding part to enter the processing space through the opening part, and transporting the received substrate in the processing space to position the received substrate at the second processing position.

The transportation device loading and unloading the substrate with respect to the processing unit can transport and position the substrate based on a unique device coordinate system in the substrate processing device and position information indicating the position to which the substrate is to be transferred.

According to the substrate processing method, the transportation device can position the substrate not yet processed to the first processing position at the time of loading the substrate to the processing unit. In addition, in the case of moving the substrate after the first process from the first processing position to the second processing position, the transportation device can position the substrate at the second processing position with the same accuracy as the accuracy of positioning the substrate in the first processing position. Accordingly, after the substrate is transported from the first processing position to the second processing position, the substrate is prevented from being displaced significantly from the second processing position.

As a result, it is possible to suppress a processing defect of the substrate from occurring due to a position displacement, without providing an expensive transportation mechanism with high positioning capability in the processing unit.

(Seventh aspect) In the substrate processing method according to the sixth aspect, it may also be that the step of transporting the substrate includes: in the transportation device, fixing the substrate to a predetermined position in the holding part in a case where the substrate is held by the holding part, and in a case where the substrate is transported and positioned from the first processing position to the second processing position, moving the holding part based on position information indicating the second processing position.

In such case, even if the position relationship between the holding part and the substrate at the time of receiving the substrate by using the holding part is not in the predetermined relationship, the position relationship between the holding part and the substrate is fixed to exhibit the predetermined position relationship. In addition, according to the substrate processing method, displacement does not occur in the position relationship between the holding part and the substrate during movement of the holding part. Therefore, at the time of transporting the substrate from the first processing position to the second processing position, by moving the holding part in accordance with the position information, the substrate held by the holding part can be accurately positioned at the second processing position.

(Eighth aspect) In the substrate processing method according to the sixth or seventh aspect, it may also be that the holding part is configured to hold the substrate in a horizontal posture, and the first processing position and the second processing position are arranged in an up-down direction.

In such case, the first processing position and the second processing position are arranged in an up-down direction. Therefore, compared with the case where the holding part holds the substrate in a vertical posture, the distance between the first processing position and the second processing position can be shorter. Accordingly, the transportation time of the substrate between the first processing position and the second processing position can be reduced.

(Ninth aspect) In the substrate processing method according to any one of the sixth to eighth aspects, it may also be that one of the first processing part and the second processing part includes: a first holding device, holding an outer peripheral end of the substrate at the first processing position; and a first cleaning device, cleaning a lower surface central region of the substrate held by the first holding device, and an other of the first processing part and the second processing part includes: a second holding device, sucking and holding the lower surface central region of the substrate at the second processing position, while rotating the substrate that is held; and a second cleaning device, cleaning a lower surface outer region of the substrate held and rotated by the second holding device.

In such case, since the substrate is accurately positioned at the first processing position, the region of the lower surface of the substrate that is supposed to be cleaned is correctly cleaned by the first cleaning device. In addition, since the substrate is accurately positioned at the second processing position, the region of the lower surface of the substrate that is supposed to be cleaned is correctly cleaned by the second cleaning device. As a result, a cleaning defect of the lower surface of the substrate due to displacement of the position of the substrate is prevented.

(Tenth aspect) In the substrate processing method according to the sixth aspect, it may also be that the step of transporting the substrate includes: in a case where the substrate is held by the holding part, detecting a relative position of the substrate with respect to the holding part by using a position detection device, and in a case where the substrate is transported and positioned from the first processing position to the second processing position, moving the holding part based on position information indicating the second processing position and the relative position of the substrate that is detected by the position detection device.

If the relative position of the substrate with respect to the holding part can be grasped, at the time of transporting the substrate from the first processing position to the second processing position, a displacement amount of the substrate with respect to the second processing position when it is assumed that the holding part has moved according to the position information can be obtained. Therefore, according to the substrate processing method, based on the relative position of the substrate detected by the position detection device, the position information can be corrected to offset the displacement amount that occurs at the time of transportation to the second processing position. As a result, by moving the holding part based on the corrected position information, the substrate held by the holding part can be accurately positioned at the second processing position.

According to the substrate processing device, a substrate processing defect due to the low accuracy in positioning the substrate at the time of transporting the substrate is suppressed. Therefore, the yield of products obtained through substrate processing is increased. As a result, wasteful substrate processing is reduced, so energy saving in substrate processing is realized. In addition, in the case where a chemical solution is used in the substrate processing, the yield can be increased and unnecessary usage of the chemical liquid can be reduced. Therefore, the pollution of the global environment can be reduced.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

What is claimed is:

1. A substrate processing device, comprising:
a processing unit;
a transportation device, having a holding part holding a substrate, and configured to be able to load and unload the substrate with respect to the processing unit by moving the holding part; and
a controller,
wherein the processing unit comprises:
a chamber, having an opening part and forming a processing space comprising a first processing position and a second processing position;
a first processing part, performing a first process on a substrate not yet processed that is accommodated in the chamber and disposed at the first processing position; and
a second processing part, performing a second process on the substrate after the first process that is accommodated in the chamber and disposed at the second processing position,
wherein the controller is programmed to control the transportation device to receive the substrate disposed at the first processing position by causing the holding part to enter the processing space through the opening part, and to transport the received substrate in the processing space to position the received substrate at the second processing position without causing the holding part to leave the processing space.

2. The substrate processing device as claimed in claim 1, wherein the transportation device comprises a fixing device fixing the substrate to a predetermined position in the holding part in a case where the substrate is held by the holding part, and
the transportation device positions the substrate with respect to the second processing position by moving the holding part based on position information indicating the second processing position.

3. The substrate processing device as claimed in claim 1, wherein the holding part is configured to hold the substrate in a horizontal posture, and
the first processing position and the second processing position are arranged in an up-down direction.

4. The substrate processing device as claimed in claim 1, wherein one of the first processing part and the second processing part comprises:

a first holding device, holding an outer peripheral end of the substrate at the first processing position; and a first cleaning device, cleaning a lower surface central region of the substrate held by the first holding device, and an other of the first processing part and the second processing part comprises:

a second holding device, sucking and holding the lower surface central region of the substrate at the second processing position, while rotating the substrate that is held; and a second cleaning device, cleaning a lower surface outer region of the substrate held by the second holding device to rotate.

5. The substrate processing device as claimed in claim 1, wherein the transportation device comprises a position detection device detecting a relative position of the substrate with respect to the holding part in a case where the substrate is held by the holding part, and the transportation device positions the substrate with respect to the second processing position by moving the holding part based on position information indicating the second processing position and the relative position of the substrate detected by the position detection device.

6. A substrate processing method, comprising:

a step of processing a substrate by using a processing unit; and a step of transporting the substrate by using a transportation device, wherein the processing unit comprises:

a chamber, having an opening part and forming a processing space comprising a first processing position and a second processing position;

a first processing part, performing a first process on a substrate not yet processed that is accommodated in the chamber and disposed at the first processing position; and a second processing part, performing a second process on the substrate after the first process that is accommodated in the chamber and disposed at the second processing position, the transportation device has a holding part holding the substrate and configured to be able to load and unload the substrate with respect to the processing unit by moving the holding part, wherein the step of processing the substrate comprises:

performing the first process on the substrate not yet processed by using the first processing part; and performing the second process on the substrate after the first process by using the second processing part, and the step of transporting the substrate comprises:

receiving the substrate disposed at the first processing position by causing the holding part to enter the processing space through the opening part, and transporting the received substrate in the processing space to position the received substrate at the second processing position without causing the holding part to leave the processing space.

7. The substrate processing method as claimed in claim 6, wherein the step of transporting the substrate comprises:

in the transportation device, fixing the substrate to a predetermined position in the holding part in a case where the substrate is held by the holding part, and in a case where the substrate is transported and positioned from the first processing position to the second processing position, moving the holding part based on position information indicating the second processing position.

8. The substrate processing method as claimed in claim 6, wherein the holding part is configured to hold the substrate in a horizontal posture, and the first processing position and the second processing position are arranged in an up-down direction.

9. The substrate processing method as claimed in claim 6, wherein one of the first processing part and the second processing part comprises:

a first holding device, holding an outer peripheral end of the substrate at the first processing position; and a first cleaning device, cleaning a lower surface central region of the substrate held by the first holding device, and an other of the first processing part and the second processing part comprises:

a second holding device, sucking and holding the lower surface central region of the substrate at the second processing position, while rotating the substrate that is held; and a second cleaning device, cleaning a lower surface outer region of the substrate held and rotated by the second holding device.

10. The substrate processing method as claimed in claim 6, wherein the step of transporting the substrate comprises:

in a case where the substrate is held by the holding part, detecting a relative position of the substrate with respect to the holding part by using a position detection device, and in a case where the substrate is transported and positioned from the first processing position to the second processing position, moving the holding part based on position information indicating the second processing position and the relative position of the substrate that is detected by the position detection device.

\*     \*     \*     \*     \*